United States Patent
Ozaki et al.

(10) Patent No.: US 9,749,449 B2
(45) Date of Patent: *Aug. 29, 2017

(54) TCP/IP-BASED COMMUNICATION SYSTEM AND ASSOCIATED METHODOLOGY PROVIDING AN ENHANCED TRANSPORT LAYER PROTOCOL

(71) Applicant: INTO CO., LTD., Toshima-ku (JP)

(72) Inventors: Hirotsugu Ozaki, Osaka (JP); Keiko Ogawa, Osaka (JP)

(73) Assignee: INTO CO., LTD., Toshima-ku (JP)

( * ) Notice: Subject to any disclaimer, the term of this patent is extended or adjusted under 35 U.S.C. 154(b) by 139 days.

This patent is subject to a terminal disclaimer.

(21) Appl. No.: 14/057,468

(22) Filed: Oct. 18, 2013

(65) Prior Publication Data

US 2014/0115320 A1    Apr. 24, 2014

Related U.S. Application Data

(63) Continuation of application No. 13/230,390, filed on Sep. 12, 2011, now Pat. No. 8,799,505, which is a (Continued)

(30) Foreign Application Priority Data

Aug. 8, 2003  (JP) ................ 2003-290822

(51) Int. Cl.
*H04L 29/06* (2006.01)
*H04L 29/08* (2006.01)

(52) U.S. Cl.
CPC ........ *H04L 69/30* (2013.01); *H04L 29/06102* (2013.01); *H04L 63/0428* (2013.01); *H04L 63/0485* (2013.01); *H04L 63/166* (2013.01)

(58) Field of Classification Search
CPC ............... H04L 29/06; H04L 29/06102; H04L 63/0428; H04L 63/0485; H04L 63/166; H04L 69/30
See application file for complete search history.

(56) References Cited

U.S. PATENT DOCUMENTS 6,058,478 A    5/2000  Davis
6,704,866 B1 *  3/2004  Benayoun ........... H04L 63/0428
                                                380/269
(Continued)

FOREIGN PATENT DOCUMENTS

EP    1 079 581 A2    2/2001
EP    1 079 581 A3    2/2001
(Continued)

OTHER PUBLICATIONS

Hidetoshi Ueno et al., "Proposal for Data Encryption Protocol in the Transport Layer for IP Multicast and its Implementation," Technical Report of the IEICE, NS2003-40, 2003, pp. 25-28. (with English Translation).

(Continued)

*Primary Examiner* — Patrice Winder
(74) *Attorney, Agent, or Firm* — Oblon, McClelland, Maier & Neustadt, L.L.P.

(57) ABSTRACT

A more secure TCP/IP protocol stack is provided having an enhanced transport layer. Encryption and decryption logic is arranged on the transmission side and on the reception side for processing a payload of a transport layer protocol, such as TCP or UDP. By employing this enhanced transport layer, a cryptograph process communication can be realized by dissolving various kinds of restrictions which a conventional IPsec or SSL possesses without affecting upper layer processing, and, at the same time, maintaining compatibility with the IP layer.

19 Claims, 26 Drawing Sheets

Related U.S. Application Data continuation of application No. 11/349,142, filed on Feb. 8, 2006, now Pat. No. 8,041,816, which is a continuation of application No. PCT/JP2004/011304, filed on Jul. 30, 2004.

(56) References Cited

U.S. PATENT DOCUMENTS

| | | | |
|---|---|---|---|
| 6,795,917 B1* | 9/2004 | Ylonen | H04L 29/06 713/160 |
| 6,981,140 B1 | 12/2005 | Choo | |
| 7,231,664 B2* | 6/2007 | Markham | H04L 63/0272 709/229 |
| 7,370,348 B1 | 5/2008 | Patel et al. | |
| 7,581,110 B1* | 8/2009 | Probasco | H04L 9/08 380/262 |
| 7,603,721 B2 | 10/2009 | Feinleib et al. | |
| 7,609,721 B2 | 10/2009 | Rao et al. | |
| 2001/0052072 A1* | 12/2001 | Jung | H04L 63/0428 713/160 |
| 2002/0042875 A1 | 4/2002 | Shukla | |
| 2003/0004881 A1 | 1/2003 | Shinzaki et al. | |
| 2003/0014624 A1 | 1/2003 | Maturana et al. | |
| 2003/0152036 A1 | 8/2003 | Brown et al. | |
| 2003/0156715 A1* | 8/2003 | Reeds, III | H04L 9/065 380/37 |
| 2004/0034773 A1 | 2/2004 | Balabine et al. | |
| 2004/0260921 A1* | 12/2004 | Treadwell | H04L 12/581 713/150 |
| 2005/0086342 A1* | 4/2005 | Burt | H04L 41/0663 709/224 |
| 2005/0175184 A1* | 8/2005 | Grover | H04L 63/06 380/278 |
| 2005/0210243 A1* | 9/2005 | Archard | H04L 63/0428 713/160 |

FOREIGN PATENT DOCUMENTS

| | | |
|---|---|---|
| JP | 2002-236618 | 8/2002 |
| WO | WO 01/10095 A2 | 2/2001 |

OTHER PUBLICATIONS

Camillo Sars, "Angoka Gijutsu ga Hiraku Internet Shinjidai—Transport-so Protocol SSH ga Kano ni suru Anzen na Enkaku Long-in," *Dr. Dobb's Journal*, Japan, vol. 7, No. 2, Kabushiki Kaisha Shoeisha, Feb. 1, 1998, pp. 63-69. (with English Translation).

Toshikazu Yamaguchi et al., "LAN Security Tsushin Gijutsu—TCP Layer ni Okeru Tsushin Data no Angoko," NTT R&D, vol. 44, No. 8, Aug. 10, 1995, pp. 653-660. (with English Translation).

T. Dierks and C. Allen, The TLS Protocol, Version 1.0, Jan. 1999, published by the Internet Engineering Task Force (ITEF).

Douglas Corner, Internetworking with TCP/IP vol. I: Principles, Protocols, and Architecture, Fourth Edition, 2000, Prentice Hall, pp. 584 through 588.

S. Kent et al., Request for Comment: 2406 IP Encapsulating Security Payload (ESP), Network Working Group, Nov. 1998, pp. 1-21, retrieved from [http://www.ietf.org/rfc/rfc2406.txt].

Supplementary European Search Report issued Nov. 24, 2011, in Patent Application No. 04771307.8.

Toshiyuki Tsutsumi, et al., "Secure TCP—providing security functions in TCP layer", Proc. INET '95, http://www.isoc.oro/inet95/proceedings/PAPER/144/abst.html, XP002626837, Jun. 20, 1995, pp. 1-9.

U.S. Appl. No. 14/245,474, filed Apr. 4, 2014, Ozaki, et al.

\* cited by examiner

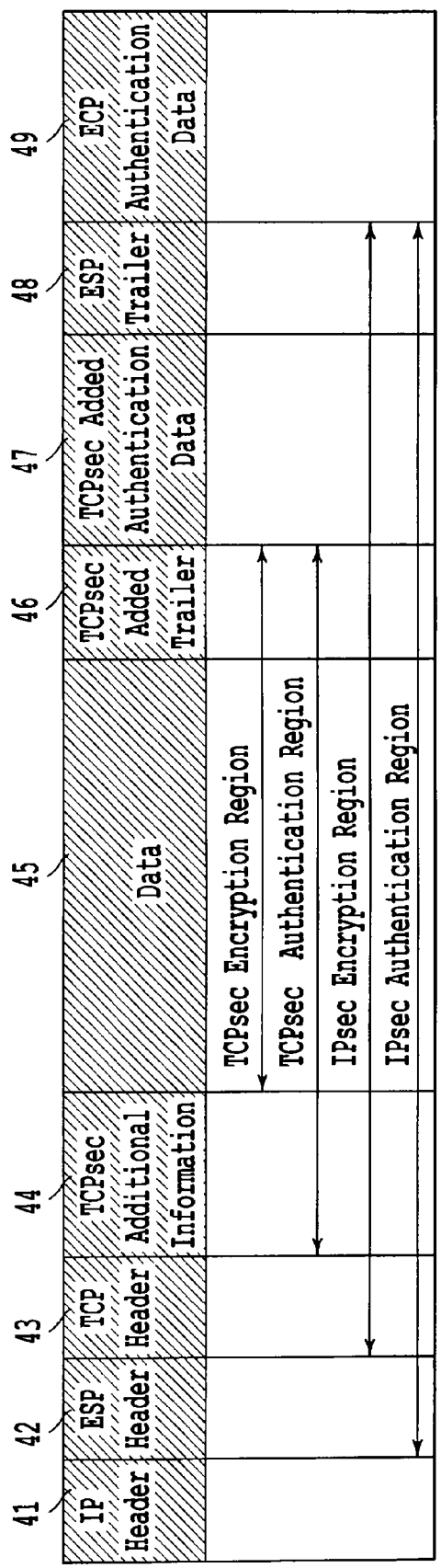
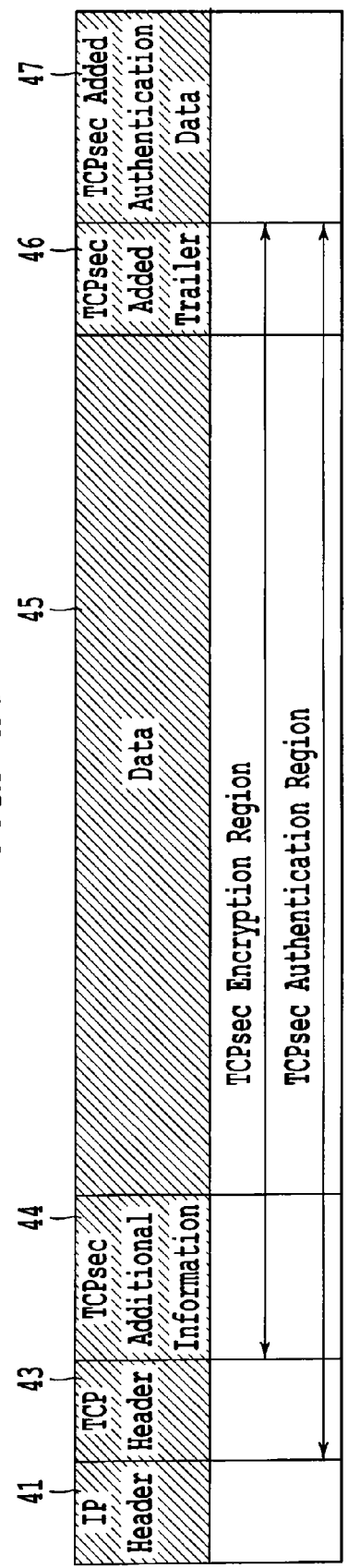
FIG. 4A
FIG. 4B

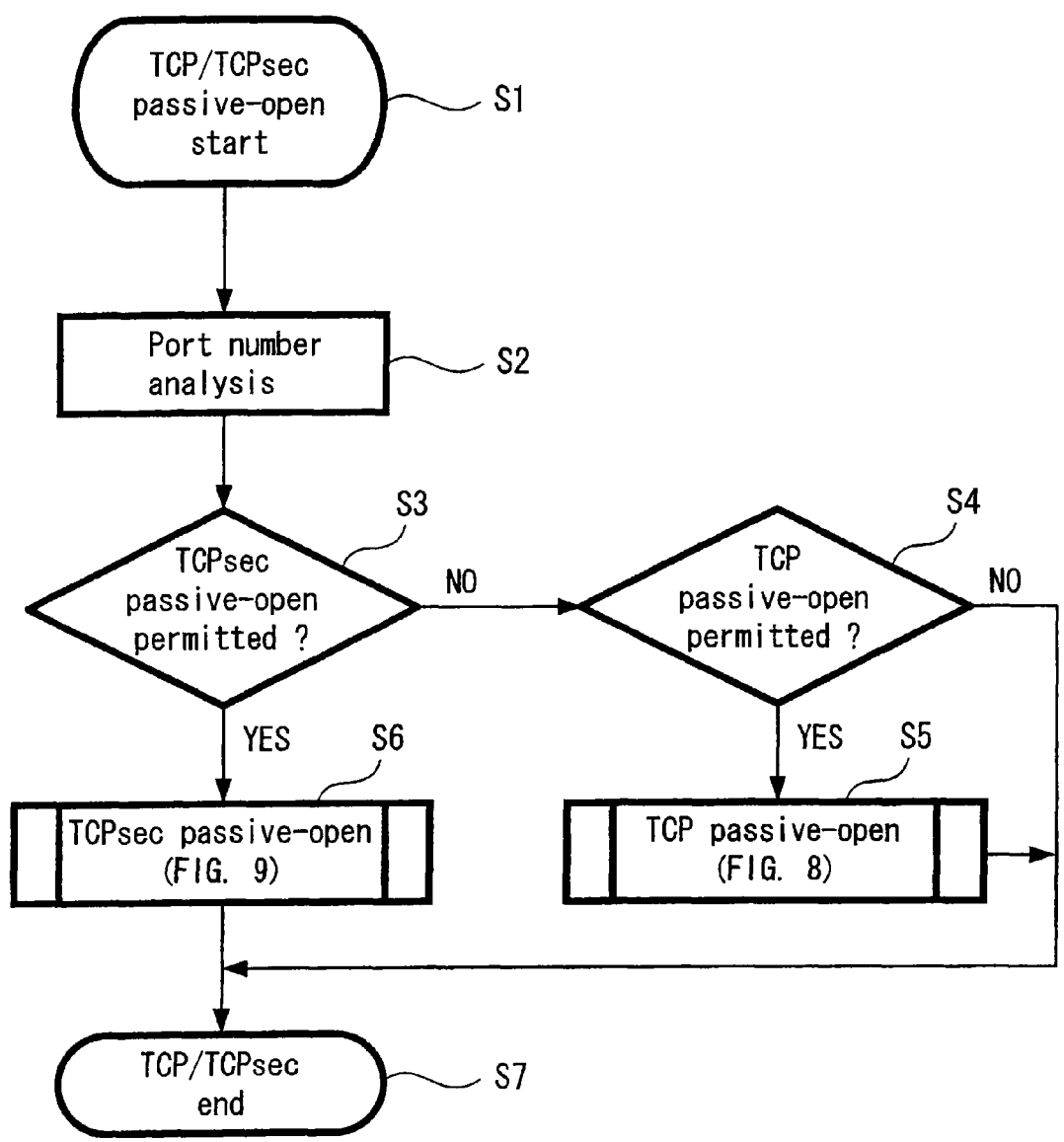

FIG. 16A Standard UDP

FIG. 16B UDPsec

TCP/IP-BASED COMMUNICATION SYSTEM AND ASSOCIATED METHODOLOGY PROVIDING AN ENHANCED TRANSPORT LAYER PROTOCOL

CROSS REFERENCE TO RELATED APPLICATION

This application is a continuation of U.S. application Ser. No. 13/230,390, filed Sep. 12, 2011, which is a continuation of U.S. application Ser. No. 11/349,142, filed Feb. 8, 2006, which is a continuation of and claims the benefit of the earlier filing date of PCT Application Serial No. PCT/JP2004/011304, filed Jul. 30, 2004, which claims priority to JP 2003-290822, filed in Japan on Aug. 8, 2003, the entire contents of each of which are incorporated herein by reference.

The present invention relates to a telecommunication security system. More particularly, the present invention relates to a TCP/IP communication system for addressing security threats, such as denial of service, spoofing, replay attacks, and like compromises of data on a network; and, furthermore, to an enhanced transport layer protocol.

BACKGROUND OF THE INVENTION

The "background" description provided herein is for the purpose of generally describing the context of the invention. Work of the presently named inventors described in this description, as well as aspects of the description which may not otherwise qualify as prior art at the time of filing, are neither expressly or impliedly admitted as prior art against the present invention.

In recent years, network communication has been widely embraced due to the proliferation of the Internet and World Wide Web. Likewise, the spread and expansion of Internet communication has led to a corresponding increase in computer-related crimes known as "hacking" and "cracking." Hacking and cracking refer to the ability of individuals and criminal organizations to misuse technology for the purposes of obtaining access to hardware and user information, unlawfully, or without permission.

For example, a denial of service attack generates a large amount of traffic through a network for the purpose of disrupting the operation of a particular computer system, such as a web server. The attack disrupts operation of the server to the point that it becomes overwhelmed by the traffic and can no longer function properly. When the server becomes overloaded owing to this disturbance, it typically goes down, rendering any content on the server inaccessible; such an attack is especially problematic for web-based e-commerce.

In addition to exploitations in TCP/IP communications, such as spoofing, there are more basic challenges to security of network terminals, such as theft of passwords and access permissions. For example, trojan programs, key loggers, and similar spy ware may be loaded to a network terminal for capturing passwords and user IDs of unsuspecting personnel utilizing the terminal. Once gaining access, unauthorized individuals may choose to maliciously destroy content, or, copy and distribute content which should otherwise be protected from access by unauthorized users. Such conduct may be thwarted by limiting access to physical facilities housing the network terminals; however, this problem is not eliminated as individuals within an organization may also engage in such behavior.

Moreover, computer viruses and worms provide another security concern in that users of network terminals often times "infect" such terminals inadvertently by visiting untrusted websites or by retrieving infected emails from untrusted sources. Of course, once one network terminal becomes infected, the infection can then be easily spread throughout an organization leading to a decreased performance in network systems and/or a complete crash of the system.

Consequently, in network communications utilizing a conventional TCP/IP (Transmission Control Protocol/Internet Protocol) or UDP (User Datagram Protocol), encryption communication, such as IPsec (Internet Protocol Security) or SSL (Secure Socket Layer), is utilized to prevent some security risks presented during the exchange of data between network terminals. In general, such encryption provides either a common key (also called a secret key) cryptograph system, and/or a public key cryptograph system. In the case of IPsec, a common key cryptograph system is used. The common key cryptograph system has an advantage in that the speed of encryption and decryption is faster with respect to the public key cryptograph system. The common key cryptograph system used in IPsec carries out encryption and decryption by the same key and enables key creation by either the transmission or the reception side of the communication. Of course, as a common key is exchanged, there is an increase risk of compromise by packet sniffing and like traffic intercepts because the common key is used on both sides of the communication.

The algorithm used in the common key cryptograph system is the DES (Data Encryption Standard: common key (secret key) encryption algorithm developed by IBM). IPsec also employs DES as one of its encryption algorithms. IPsec was promoted by the IETF (Internet Engineer Task Force) for standardization and the feature thereof lies not only in encrypting a specific application, but also in encrypting every communication transmitted from the host at the IP layer of the OSI model. In this manner, it becomes possible for a user to have a secure communication without being conscious of the underlying security application. Also, IPsec makes it possible to evolve the encryption algorithm without changing the basic IPsec structure.

A 32 bit code referred to as SPI (Security Pointer Index) is used for the common encryption key in IPsec based on a Security Association (SA) and IKE (Internet Key Exchange) is used for the key exchange protocol. Further, IPsec is provided with a protocol AH (Authentication Header) for providing integrity and authentication through encryption.

Also, Secure Socket Layer (SSL) is an HTTP protocol with a security function which was developed by Netscape®. Through HTTP, a client and a server authenticate each other on the network using SSL to interact with highly confidential information such as credit card information or the like, by encrypting it. In this manner, it is possible to prevent sniffing of data, replay attacks (capturing confidential data to be resent later), spoofing, falsifying of data and the like.

FIG. 25 shows an example of a TCP/IP protocol stack relative to the OSI model illustrating an encryption communication by using conventional IPsec. FIG. 26 shows an example of a TCP/IP protocol stack relative to the OSI model in a case of carrying out an encryption communication by using conventional SSL.

The OSI reference model is well known and is constituted such that a bottom layer (first layer) is a physical layer, a second layer is a data-link layer, a third layer is a network layer, a fourth layer is a transport layer, a fifth layer is a session layer, a sixth layer is a presentation layer and a top layer (seventh layer) is an application layer. The hierarchy in this OSI reference model is illustrated by dividing a communication function into seven stages and a standard function module is set for every layer. In the TCP/IP of FIG. 25, only five layers of the OSI reference model are shown.

The TCP/IP protocol stack is typically expressed in software or firmware, each protocol of the stack being conceptually positioned in a respective OSI layer of the hierarchy.

First, to explain the distinctions between layers of the OSI reference model, the physical layer (first layer) is a layer which defines a physical electrical characteristic of the signal line. However, it is rare case that this layer is defined and mounted alone. Ordinarily layer 1 is defined, for example, as an Ethernet standard or the like together with the data-link layer of the second layer.

The data-link layer (second layer) is a layer which defines packet format, physical node addresses, a transmitting and receiving method of packets and the like. Layer 2 defines a protocol for interacting packets between two nodes through a physical communication medium. In this second layer, some kind of address or Medium Access Control (MAC) identifier is added with respect to each node and packets are transmitted on the communication medium by specifying a transmission source of the packets. As to communication mediums, there are diversified types of copper wiring, wireless, optical fiber and the like. Also, with respect to the connection mode (topology), there is not only point-to-point connection but also bus, star, and link topologies. The packet transmitted on the communication medium is provides to a node at a reception side where it is processed with respect to the remaining OSI layers.

For example, a NIC (Network Interface Card) functions in conjunction with an associated driver to operate at the physical layer and data-link layer for connecting a personal computer, a printer or the like to a premises network (LAN). In many cases, the NIC interfaces to an Ethernet.

By means of the NIC, a node (apparatus) which wants to transmit data awaits a vacant time slot to start a transmission via the Ethernet. At that time, if a plurality of nodes start transmissions simultaneously, data collide in the cable and are broken-down, so that transmitting nodes stop transmissions and will restart transmissions after waiting a random of time. In this manner, it is possible for a plurality of nodes to share a single cable so as to communicate mutually.

The network layer (third layer) is a layer which defines a communication method between two arbitrary nodes. In the case of TCP/IP, the third layer corresponds to an IP layer. It is possible in the data-link layer to carry out a communication between nodes on the same network medium. The role of the network layer is to communicate by using routing between two arbitrary nodes existing on the network. Here, "routing" refers to transmitting IP packets by selecting an optimum path when packets are transmitted to a host in the TCP/IP network. For example, communication is carried out in the network layer between two Ethernet segments by routing packets. Also, it is possible to route packets not through physical network media but by routing to a dial-up PPP (Point to Point Protocol) line which connects a computer to a network (Ethernet) through a telephone line, also by routing to an exclusive line using an optical fiber and the like. For this purpose, addresses (IP addresses in case of TCP/IP) which are not dependent on the physical medium are ordinarily allotted to respective nodes and the routing is carried out based thereupon. IPsec encrypts every communication in this network layer.

The transport layer (fourth layer) is a protocol layer for realizing a hypothetical communication path in which there is no error between two processes executed on respective nodes. In the case of TCP/IP, it corresponds to the TCP layer. The network layer offers a function to carry out a communication between two nodes. The role of the transport layer is to offer a hypothetical communication path by using this in which there is no error between two processes (applications). More specifically, it is possible to transmit data in the network layer, but there is no guarantee that the data will arrive at a destination. Also, there is no guarantee either that the data will arrive correctly in the transmitted order. Consequently, the transport layer provides a communication path in which there is error protection. For example, if it is necessary, data can be resent and recovery processes or the like may be carried out.

User Datagram Protocol (UDP) is also disposed in this transport layer together with TCP. The difference between UDP and TCP lies in that UDP provides high speed communication relative to TCP due to the non-compensation for data errors. TCP is used primarily to transmit data such as a case of a communication between computers. UDP is used primarily when audio and video is transmitted such as in the case of voice over IP (VoIP).

The session layer (fifth layer) defines a procedure of a session (from start to end of a communication) and enabling a communication by establishing a connection between applications. A socket disposed in this layer is defined as an IP address which the computer possesses and a port number which functions as a sub address of the IP address. In case of connecting nodes, a session is carried out by always appointing a socket (pair of IP address and port number). As shown in FIG. 26, according to SSL which is a conventional representative encryption communication technology, an encryption communication is realized in this session layer.

The presentation layer (sixth layer) defines an expression method; coding, encrypting or the like, of the data which are interacted in the session (start to end of a communication). In the TCP/IP protocol, there is no function corresponding to this layer. The stream data process is ordinarily handled by the application itself.

Also, the application layer (seventh layer) defines data interaction between applications; there is no function corresponding to this layer in the TCP/IP protocol. The application layer defines, for example, an electronic mail format, an internal structure of a document text or the like which is a common data structure or the like necessary in case of interacting data between applications bilaterally.

FIG. 25 shows a standard TCP/IP protocol stack equipped with IPsec in which, an NIC (Network Interface Card) driver is provided in the physical layer (first layer) and the data-link layer (second layer). This interface card connects hardware of a computer or the like to a network, and includes software for performing transmission and reception control, such as WINSOCK. In the network layer of FIG. 25, there exists an IP emulator, a portion of which is elongated and extending upward to the transport layer (fourth layer). The portion extended to the transport layer is not mounted with transport functionality. A function of the network layer is only provided for the session layer. This IP emulator carries out an encryption communication by IPsec and IP. Also, ARP (Address Resolution Protocol) is disposed in the network layer of the third layer. The ARP is a protocol to be used for finding a MAC address, which is typically a physical address of Ethernet resolved from an IP address. MAC is a transmission control technology utilized in LAN or the like for defining a transmitting and receiving method of a frame, defining a transmitting and receiving unit of data, a frame format, error correction and the like.

Also, the network layer is provided with an ICMP (Internet Control Message Protocol). ICMP transfers an error message and a control message of IP for such purposes as PINGing a destination host. IGMP (Internet Group Management Protocol) controls a host group (i.e., multicast) for distributing the same data to a plurality of hosts efficiently or being constituted for receiving the distribution. TCP and UDP are disposed in the transport layer which is an upper layer relative to the network layer, a socket interface is disposed in the session layer which is an upper layer thereof.

FIG. 26 shows an example of a standard TCP/IP protocol equipped with SSL for an encryption processing protocol. The network layer is not equipped with IPsec, but the socket (session layer) is equipped with SSL instead. Other protocols of FIG. 26 are same as those shown in FIG. 25.

In conventional encryption communication technologies, IPsec provides transmission and reception by encrypting IP packets. Consequently, this operation is transparent to application software which utilizes upper protocols of TCP, UDP or the like to be aware of a fact that IPsec is used.

On the other hand, in SSL, a digital certificate using RSA (Rivest, Shamir, Adleman) public key cryptograph technology provides the authentication level. A common key cryptograph technology such as DES or the like is used for the data encryption. SSL lies in the session layer of the fifth layer, so that it is dependent on a specific application.

IPsec is designed to prevent security compromises by ansuring the integrity and authentication of communications. On the other hand, SSL is an encryption technology in the fifth layer and is one for transmitting and receiving information relating to privacy, company secret information, etc., securely by encrypting data of the World Wide Web, FTP (File Transfer Protocol) or the like.

Table 1 is a table describing functions of IPsec and SSL by a comparison thereof. As seen from this table, IPsec and SSL have mutually exclusive advantages and defects.

For example, in the case of SSL, for the communication between client-client, the SSL message exchange and communication content becomes a master/slave relationship. In other words, the relationship is more client/server, so that the communication between client-client could not be carried out without employing a server. More specifically, in a case when secret data are transmitted from a terminal A to a terminal B by SSL encryption, it was always necessary to interpose a server therebetween. On the other hand, there is not such a restriction in IPsec, as direct communication is enabled.

TABLE 1

Comparison of IPsec and SSL Functions

| | | IPsec | | SSL |
|---|---|---|---|---|
| (1) communication between client-client | ○ | Direct communication is available. | x | Direct communication is unavailable. Communication is available through a special server. |
| (2) PPP Mobile Environment (3) ADSL Environment | Δ | It is possible by utilizing XAUTH. However, there is a problem of security. | ○ | Communication is available. |
| (4) NAT, IP Masquerade Environment | Δ | It can be realized by being commonly used with NAT-T. | ○ | Communication is available. |
| (5) DoS Attack to TCP/IP Protocol Stack | ○ | It is possible to have correspondence with DoS attack. | x | Correspondence is unavailable. |
| (6) Under Bad Communication Environment (Environment where Communication Errors often Occur Caused by Many Physical Noises) | x | Correspondence is inadequate. Lowering of throughput is incurred. | ○ | Correspondence is available. |
| (7) Communication between Different LANs | Δ | Communication is unavailable when the subnet address is the same address. | ○ | Communication is available. |
| (8) Different Network Environment | Δ | Management is hard and difficult. | ○ | Management can be simplified. |
| (9) Connection through a plurality of Carriers | x | Communication is unavailable. | ○ | Communication is available. |
| (10) Secure Communication of All UDP Ports | ○ | Secure communication is possible. | x | Communication is unavailable. |
| (11) Secure Communication of All TCP Ports | ○ | Secure communication is possible. | x | Communication is unavailable except a specific TCP port. |
| (12) Limitation in Application | ○ | Not affected. | x | It is necessary to change the socket program. |
| (13) Access Unit | | IP Unit | | Resource Unit(URL Unit, Folder Unit) |
| (14) MTU(Maximum Segment Size) | Δ | Adjustment is necessary. | ○ | Communication is Available without being Conscious of MTU. |
| (15) Internet Telephone Using VoIP under Mobile Environment | Δ | It is possible by utilizing XAUTH. However, there is a problem of security. | x | It cannot be used. |

TABLE 1-continued

Comparison of IPsec and SSL Functions

| | IPsec | | SSL | |
|---|---|---|---|---|
| (16) Internet Telephone Using VoIP under ADSL Environment | Δ | It is possible by utilizing XAUTH. However, there is a problem of security. | x | It cannot be used. |
| (17) Internet Telephone Using VoIP between Different LANs | Δ | It can be realized by using NAT-T, IPsec-DHCP. | x | It cannot be used. |
| (18) Internet Telephone Using VoIP between LANs of Plural Carriers | x | Communication is unavailable. | x | It cannot be used. |

Also, in a PPP (Point to Point Protocol) mobile environment, or, an ADSL (Asymmetric Digital Subscriber Line) environment, IPsec carries out authentication of its connecting partner. The authentication is via a communication using an IKE (Internet Key Exchange) protocol used for the determination of Security Associations (SA), such as encryption system, key exchange, and bilateral authentication before it starts an encryption communication of data. Yet, in the case of the PPP Mobile Environment (remote client) or the ADSL Environment, the IP address cannot be fixed. So, the main mode of IKE, used most between gateways of IPsec, in other words, a mode using IP address information of a communication partner for authentication, cannot be used. It should be noted that the IP address need not be used for ID information in an aggressive mode. In the aggressive mode, for example, user information is used for the ID information such that it becomes possible to specify a partner by using a password of a user as the common key. However, in the aggressive mode, the ID of the connecting partner is transmitted in a message which is the same as key exchange information, so that the ID is transmitted as a plaintext without encryption. Also, the authentication problem can be solved by utilizing XAUTH (Extended Authentication within IKE), but the IP address is unknown in the access by a remote client in a firewall setting, so that it becomes necessary to permit all of IKE and IPsec such that problems relating to security remain. Speaking of SSL, it is possible to communicate even under the environment described above.

Also, there is a problem in IPsec that it cannot communicate with NAT (Network Address Translation) and IP masquerade. In order to communicate therewith, it has to be commonly used with other function such that, for example, it is to be listed in a payload of UDP. NAT is a technology for a company or the like connected to an Internet to share one global IP address in a plurality of computers and a technology for bilaterally-converting IP address (local address) available only in an organization and address (global address) on the Internet. The reason why it cannot communicate with NAT is because it becomes impossible for the bilateral conversion of the global address to be performed by this local address since the IP header is in an authentication region of AH (Authentication Header) and it becomes impossible for local address peers having different sub-nets to communicate with each other.

IP masquerade makes it possible to access the Internet from a plurality of clients who possess private addresses in LAN and it can be said, seen from a view point of security, that it is desirable to utilize this arrangement, because only a terminal which is operated by the IP masquerade can be seen from the outside (Internet). The reason why IPsec cannot communicate with IP masquerade is because the ESP (Encapsulating Security Payload: encrypted payload) header of IPsec is positioned just after the IP header. An ordinarily router mounted with IP masquerade judges such that a TCP/UDP port number is to be positioned just after the IP header. Consequently, that port number is made to change if it goes by way of a router mounted with IP masquerade, so that IPsec judges that there was a falsifying and there occurs a problem that the authentication of the host cannot be obtained. It is possible to avoid this problem by utilizing a product which supports NAT-T (NAT-Traversal) for taking onto a payload of UDP. However, it is not possible to connect even NAT-T peers if versions of NAT-T are different from each other. It is possible for SSL to communicate even under the environment described above.

On the other hand, SSL is not helpless with respect to various kinds of attacks to TCP/IP. When a DoS attack to the TCP/IP protocol stack occurs, for example, a TCP cutoff attack takes place, the TCP session is cutoff such that service to SSL is stopped. The IP layer possess a security function since the IPsec is mounted in the third layer (IP layer), so that it is possible to prevent a DoS attack to TCP/IP (fourth layer, third layer). However, SSL is an encryption protocol which is mounted in a layer (fifth layer) upper than the TCP/IP (fourth layer, third layer), so that it is impossible to prevent a DoS attack to TCP/IP.

Further, SSL is more effective as compared with IPsec with respect to a communication under an inferior communication environment such as environments exhibiting physical layer noise and communication errors. More specifically, it becomes a situation for IPsec in the case of detecting an error that the resending operation is to be dependent on the upper TCP. TCP transmits resending data to IPsec, but IPsec cannot recognize resent data such that a re-encryption is to be carried out. SSL carries out an error recovering process by TCP, so that the same data is never re-encrypted.

Also, it is not possible for IPsec to communicate between different LANs. More specifically, distribution management of sub-net addresses in LAN is managed by DHCP (Dynamic Host Configuration Protocol) server existing in the LAN, the same sub-net addresses are never allocated in a LAN. But, there is a possibility in case of a communication between different LANs that the same addresses are allocated, because the DHCP servers existing in the respective LANs allocate sub-net addresses individually. In a case when the same addresses are allocated in this manner, it is not possible for the IPsec to communicate. However, it is possible to communicate therein if an IPsec—DHCP servers are set up differently so as to be managed such that same addresses never occur. The SLL is positioned in the fifth layer (session layer) of the OSI reference model as mentioned above, so that an error recovering process can be performed in TCP of a lower layer and it becomes possible to communicate under an inferior environment as described above.

Also, with respect to the communication under different network environments, IPsec has to manage all of the nodes along a route and to make setting changes such that the IPsec can pass therethrough. The management becomes difficult, but it is possible for SSL to carry out a communication even under this environment without being conscious of the environment of the nodes which are traversed during communication.

Further, there is a problem in IPsec that a connection through a plurality of carriers cannot be attained. In other words, IPsec has to manage all of the traversed nodes and to make setting changes such that IPsec can pass therethrough, so that a connection through a plurality of carriers cannot be attained. For example, in a case when contracts with different carriers in separate locations, such as Tokyo and Osaka, Japan, it is not possible to connect there between, so that there is also a case in which expensive exclusive lines are additionally required. It is possible for SSL to communicate even under this environment described above.

It is not possible for SSL to communicate UDP by encryption, because it does not support UDP communication. It is not possible for TCP either to communicate all of TCP ports by encryption, because it only supports specific ports. On the other hand, it is possible for IPsec to communicate either one of UDP and TCP by encryption.

Further, SSL is deficient in that it does not have compatibility with respect to the application. The application uses the socket (fifth layer) as a program interface when an Internet communication is carried out. Therefore, in a case when the application uses SSL (fifth layer), this socket interface must be changed to a SSL interface. Consequently, SSL has no compatibility with the application. On the other hand, IPsec is positioned lower than the socket (fifth layer), so that the socket (fifth layer) can be used as a program interface directly for the application such that it has compatibility with the application.

Also, while IPsec can control according to the IP address unit, SSL is to control according to the source unit (URL unit, folder unit).

Further, IPsec has a problem that the maximum segment size becomes small. More specifically, since IPsec uses an ESP header and an ESP trailer, the payload becomes small, so that fragment (division of packet) occurs and the throughput is lowered. Also, since the fragment is prohibited for the TCP packet, it is necessary in the end-end communication to comprehend environment in which IPsec passes and to set a maximum segment size by which a fragment does not occur. On the other hand, it is not necessary for SSL to comprehend an environment for passing through, so that it is not necessary to set the maximum segment size.

The protocol of the present invention described hereinafter is an encryption communication protocol which includes all of the advantages of IPsec and SSL, as well as those which will be appreciated from a reading of the following sections, while remedying at least the deficiencies discussed above.

BRIEF SUMMARY OF THE INVENTION

The present invention provides a communication system, including a protocol encryption agent of a transport layer of a TCP/IP stack configured to encrypt at least a payload of a TCP/IP transport layer protocol packet defining an information payload for transmission from the node. A protocol decryption agent of a transport layer of a TCP/IP stack configured to decrypt an encrypted TCP/IP transport layer packet information payload communicated to the node. The communication exchange with a further node is carried out encrypting and decrypting the packet information of the transport layer protocol.

A communication apparatus which carries out a communication by encrypting a protocol positioned in a transport layer is provided. A node authentication unit is configured to authenticate communications to the communication apparatus. An authentication information addition unit is configured to transmit at least a payload of a protocol corresponding to TCP or UDP in a packet which is an information unit to be transmitted and received, by adding authentication information. A protocol authentication unit is configured to authenticate a received protocol, including said added authentication information, wherein a communication is carried out by using standard TCP or UDP protocol of TCP/IP.

A communication system is provided which may include a plurality of nodes for communicating packet data. At least two nodes employ a protocol encryption and protocol decryption unit configured to encrypt at least a playload of a protocol of a TCP/IP transport layer in a packet of an information unit for transmission from the at least two nodes. A protocol decryption unit is configured to decrypt encrypted TCP/IP transfer layer protocol layer payloads communicated to the nodes. A third node includes a TCP/IP protocol stack. The at least two nodes communicate with the third node through the TCP/IP protocol stack, the, at least, two nodes communicate with each other through a TCP/IP protocol stack, wherein the encryption unit and decryption unit are invoked so as to interoperate with TCP/IP to provide communication through an encrypted transport layer protocol of TCP/IP.

A removable hardware device configured to be interposed along a communications path of a communication device, comprising a protocol encryption agent of a transport layer of a TCP/IP stack configured to encrypt at least a payload of a TCP/IP transport layer protocol packet defining an information payload for transmission from the node; a protocol decryption agent of a transport layer of a TCP/IP stack configured to decrypt an encrypted TCP/IP transport layer packet information payload communicated to the node, wherein a communication exchange with a further node is carried out by encrypting and decrypting the packet information payload of the TCP/IP transport layer protocol.

It is to be understood that both the foregoing general description of the invention and the following detailed description are exemplary, but are not restrictive, of the invention.

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed description when considered in connection with the accompanying drawings wherein:

FIG. 4A is a diagram showing a packet structure of encryption regions and application regions of completeness authentication with respect to TCPsec/IPsec;

FIG. 4B is a diagram showing a packet structure of encryption regions and application regions of completeness authentication with respect to TCPsec/IP;

FIG. 5 is a flowchart showing a TCP/TCPsec passive-open process according to an exemplary embodiment of the present invention;

DETAILED DESCRIPTION OF THE INVENTION

Figure 1:
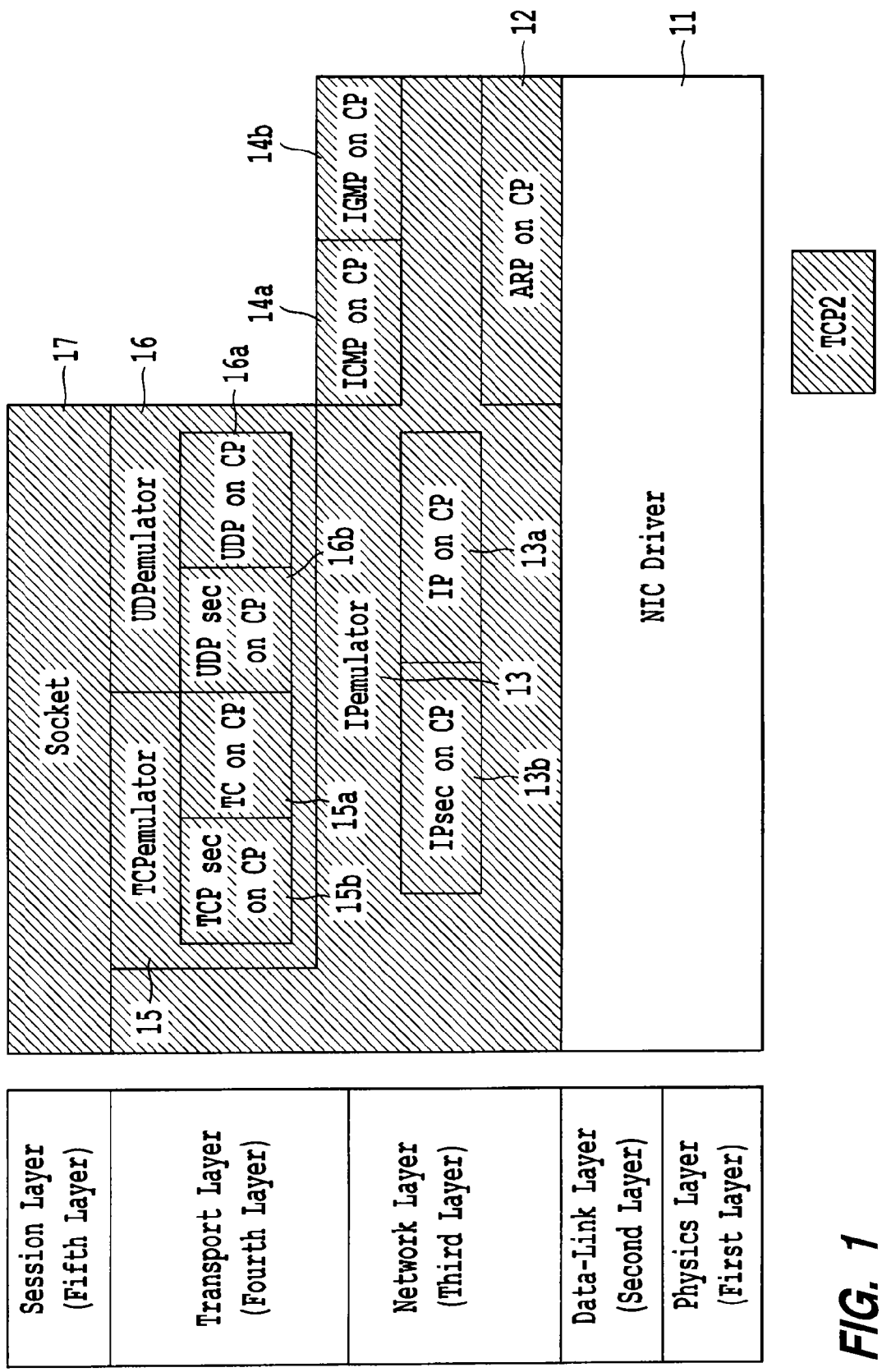
FIG. 1 is a communication layer diagram showing a protocol stack used in a communication system according to the present invention.

Certain terminology used in the following description is for convenience only and is not limiting. The term "$TCP^2$" as used herein refers to en exemplary embodiment of the invention, which employs transport layer protocols, UDPsec and/or TCPsec. The term "node" as used herein refers to a point along a communication path in which a device processes transffic in accordance with the exemplary embodiment of the invention. Thus, "Node" embraces routers, gateways, bridges, personal computing devices, servers, and the like. In the drawings, the same reference numerals are used for designating the same elements throughout the several figures.

Hereinafter, examples of exemplary embodiments according to the present invention will be explained with reference to FIG. 1 through FIG. 26, wherein like reference numbers illustrate like elements throughout the drawings.

FIG. 1 shows a protocol stack used in one exemplified embodiment of an encryption/decryption communication system according to the present invention. The exemplary protocol stack, as shown in FIG. 1, disposed with a NIC (Network Interface Card) driver 11 in a hierarchy corresponding to a physical layer (first layer) and a data-link layer (second layer) of OSI model. This driver is, as known to those skilled in the art, an interface card driver for connecting hardware of a computer or the like to a network. The driver is typically embodied in software or firmware for data transmission and reception control. For example, a LAN board or a LAN card for connecting to Ethernet is an example of such functionality.

An IP emulator (emulator) 13 which is partially extended upward to the transport layer (fourth layer) exists in the network layer (third layer). A transport function is not mounted on aforesaid extended portion of the IP emulator. The extended portion offers a function of the network layer to the session layer. The IP emulator 13 is provided to carry out an operation of using "IPsec on CP" 13b which is a protocol carrying out an encryption, communication, and "IP on CP" 13a by switching according to an application. Here, the terminology "on CP" means "cracking protector," that it is to set protection against known TCP/IP exploits.

Also, the network layer is disposed with ARP on CP (Address Resolution Protocol on Cracking Protector). The ARP on CP is a protocol used for resolving a MAC (Media Access Control) address from an IP address, equipped with a protection countermeasure against a cracker.

Here, the IP emulator 13 is software or firmware enabling various kinds of security functions according to an exemplary embodiment of the present invention being matched with a conventional TCP/IP stack. More specifically, it is an ICMP (Internet Control Message Protocol) 14a which is a protocol for transferring an IP error message or a control message (PING). An IGMP (Internet Group Management Protocol) 14b which is a protocol (multicast) for controlling a host group constituted for distributing same data to a plurality of hosts efficiently or for receiving such distribution, TCP 15 and software, firmware or hardware for matching to UDP 16 and further to a socket (Socket) interface 17. As can be appreciated, the IP emulator 13 carries out an adaptation process before and after an IPsec encryption and decryption, a necessary authentication information addition and authentication or the like.

A TCP emulator 15 and a UDP emulator 16 are disposed in a transport layer (fourth layer) in an upper layer with respect to the IP emulator 13. The TCP emulator 15 has an operation for using "TCPsec on CP" 15b which is a protocol for carrying out an encryption communication, and, "TCP on CP" 15a which is a communication protocol by switching according to an application. Similarly, the UDP emulator 16 has an operation for using "UDPsec on CP" 16b which is a protocol carrying out an encryption communication and "UDP on CP" 16a which is a communication protocol by switching according to an application program.

The encryption communication protocol of TCPsec 15b and UDPsec 16b are mounted in the transport layer (fourth layer). The mounting of these protocols in the transport layer will be explained in detail herein.

A socket interface 17 carrying out data exchange with a protocol of TCP, UDP and the like is provided in an session layer (fifth layer) which is an upper layer of the transport layer (fourth layer). The socket is well known in the art, and combines an IP address corresponding to an address in a network which a computer possesses with a port number which is a sub address of the IP address. Practically, the socket typically is embodied via a single software and/or firmware program module carrying out addition or cancellation of a sequence of headers all together (execution program or the like) or a single hardware module.

The socket interface 17 provided a unified access system from a further upper application (EC application shown in FIG. 2, broadcasting application shown in FIG. 3 and the like) such that a similar interface is provided.

The TCP emulator 15 operates in the transport layer for distributing packets to either one of the TCPsec 15b and TCP 15a. TCPsec 15b provides encryption, completeness authentication, partner authentication or the like. TCP 15a provides conventional TCP functionality. Also, both of TCPsec 15b and TCP 15a is provided with a cracking-protector (CP), so that it is possible to defend against TCP/IP exploiting. The TCP emulator 15 also functions as an interface with the socket positioned in an upper layer.

As known to those skilled in the art, UDP does not have an error compensation function; TCP has an error compensation function. UPD transfer speed is faster as compared to TCP, and also a broadcast function is provided. The UDP emulator 16 has, similarly as TCP emulator 15, an operation for distributing packets to either one of the UDPsec 16b or UDP 16a. UPDsec 16b provides encryption, completeness authentication, partner authentication. UDP 16a provides conventional UDP functionality.

As shown in FIG. 1, protocol stacks consisting of the socket 17, the TCP emulator 15, the UDP emulator 16, the "TCPsec on CP" 15b, the "UDPsec on CP" 16b, the "TCP on CP" 15a, the "UDP on CP" 16a, the "ICMP on CP" 14a, the "IGMP on CP" 14b, the IP emulator 13, the "IP on CP" 13a and the "ARP on CP" 12 embody a protocol stack carrying out an encryption process according to an exemplary embodiment present invention. Hereafter, the protocol stack will be referred to generically as TCP$^2$. It should be noted that "IPsec on CP" 13b may be omitted in an alternative embodiment.

TCP$^2$, according to the exemplary embodiment, provides a standard protocol of TCP, UDP, IP, IPsec, ICMP, IGMP and ARP imounted with CP (cracking-protection). In this way, it is possible to protect against an attack from a communication with respect to the respective protocols and against an attack (trojan horse, falsifying of a program, and the like) from an application-program. Also, in TCP$^2$, the TCP emulator 15 is mounted and keeps compatibility seen from the socket 17 existing in the session layer and from the IP emulator 13 existing in the network layer, so that the socket appears as a standard TCP socket to upper layers. Actually, TCP and TCPsec are switched so as to be executed as a TCP$^2$ function. TCPsec is an encryption and authentication function in the transport layer according to the exemplary embodiment of the present invention.

TCP$^2$ may be ported to an operating system of a communication device by including it as a driver of the operating system. For example, in Windows' based machines, a TCP$^2$ driver would be added to the WINSOCK. Likewise, the TCP$^2$ system may be incorporated directly into the TCP/IP stack of the operating system. In an alternative embodiment of the invention, the TCP$^2$ instruction set may be provided via a removable hardware device, such as a USB key interposed along the communication path of a communication device.

Also, TCP$^2$ is similarly mounted with a UDP emulator 16 and keeps compatibility seen from the socket 17 existing in the session layer and from the IP emulator 13 existing in the network layer, so that the socket appears as a standard TCP socket to upper layers. Actually, UDP and UDPsec are switched so as to be executed as a TCP$^2$ function. UDPsec is an encryption and authentication function in the transport layer according to an exemplary embodiment of the present invention.

Next, the functionality of TCPsec 15b and the UDPsec 16b functionally is explained.

A publicly known secret key (common key) encryption algorithm is used as an encryption and decryption method (algorithm and logic) for the TCPsec 15b and the UDPsec 16b. For example, a DES (Data Encryption Standard) which is a secret key encryption algorithm developed by IBM® or a 3DES version is used. Further, an IDEA (International Data Encryption Algorithm) by Mr. James L. Massey and Mr. Xuejia Lai of Swiss Institute of Technology in 1992 is also used for other encryption algorithms. This encryption algorithm has 128 bits for the length of a cryptograph key, because data is encrypted by being divided into a block of 64 bits. It is designed so as to possess enough strength also with respect to a linear decryption method for decrypting the secret key cryptograph efficiently or a difference decryption method.

In addition, a cryptograph system called FEAL (Fast Data Encipherment Algorithm), MISTY or AES (Advanced Encryption Standard) is also utilized as a cryptograph system of the TCPsec 15b and the UDPsec 16b which are employed in an exemplary embodiment of the present invention and further, it is also possible to utilize a secret encryption and decryption algorithm created independently. Here, FEAL is a cryptograph system developed by Nippon Telegraph and Telephone Corporation and is a cryptograph system of a secret key type which uses the same key for the encryption and the decryption. This FEAL has an advantage that encryption and decryption are realized with a high speed as compared with DES.

Next, MISTY which is a cryptograph system similarly utilized in the present invention is a cryptograph system of a secret key type developed by Mitsubishi Electric Corporation and data are encrypted by being divided into a block of 64 bits just like IDEA. The key length is 128 bits. This system is the same as DES or the like in that the same program is used for the encryption and the decryption. This system is also designed so as to possess enough strength also with respect to a linear decryption method for decrypting the secret key cryptograph efficiently or a difference decryption method.

Also, AES is a standard encryption system for the next generation of U.S. Government applications. A system called Rijndael which was developed by Mr. Joan Daemen and Mr. Vincent Rijmen who are Belgium cryptograph developers was employed in October 2000 among some cryptograph systems collected around the world by inviting public participations.

In this manner, various kinds of secret key encryption algorithms can be employed as a cryptograph system of the TCPsec 15$b$ and the UDPsec 16$b$ according to the present invention and moreover, it is possible to utilize also a secret key (common key) cryptograph system developed independently by users.

Further, an authentication algorithm of an algorithm utilizing a public key or secret pre-sharing (Pre-shared) such, for example, as MD5 (Message Digest 5), SHA1 (Secure Hash Algorithm 1) or the like is used as a method of "partner authentication" and "completeness authentication" for preventing so-called "spoofing" and "data falsifying" or the like. Also, it is also possible to employ an original algorithm utilizing a unidirectional function in place of such a publicly known authentication algorithm.

This MD5 is one of hash functions (unidirectional summary functions) which are used for authentication and digital signature in which it becomes possible to detect whether or not an original text of a portion of a communication is falsified by generating a hash value of a fixed length based on the original text and by comparing this on both ends on the communication path. This hash value takes a value such as a quasi random number and it is made to be unable to reproduce the original text based thereon. In addition, it is difficult for another message to create the same hash value.

SHA1 is also one of hash functions which are used for authentication, digital signature or the like in which it becomes possible to detect falsifying of an original text on a portion of a communication by creating a 160 bits hash value from the original text of 64th power of 2 or less bits and by comparing on the both ends of the communication path. This authentication algorithm is employed also in IPsec which is a representative of conventional Internet encryption communications.

It should be noted that it is designed with respect to these authentication algorithms such that a secure key exchange can be carried out by means of DH (Diffie-Hellman) public key distribute method, IKE (Internet Key Exchange) protocol (No. 500 of UDP) similar as IPsec or the like and furthermore, it is scheduled by a protocol driver program (TCPsec 15$b$, UDPsec 16$b$ or the like) such that encryption/ completeness authentication algorithm (logic) itself and the set/domain of the key for that purpose will be changed periodically.

Figure 2:
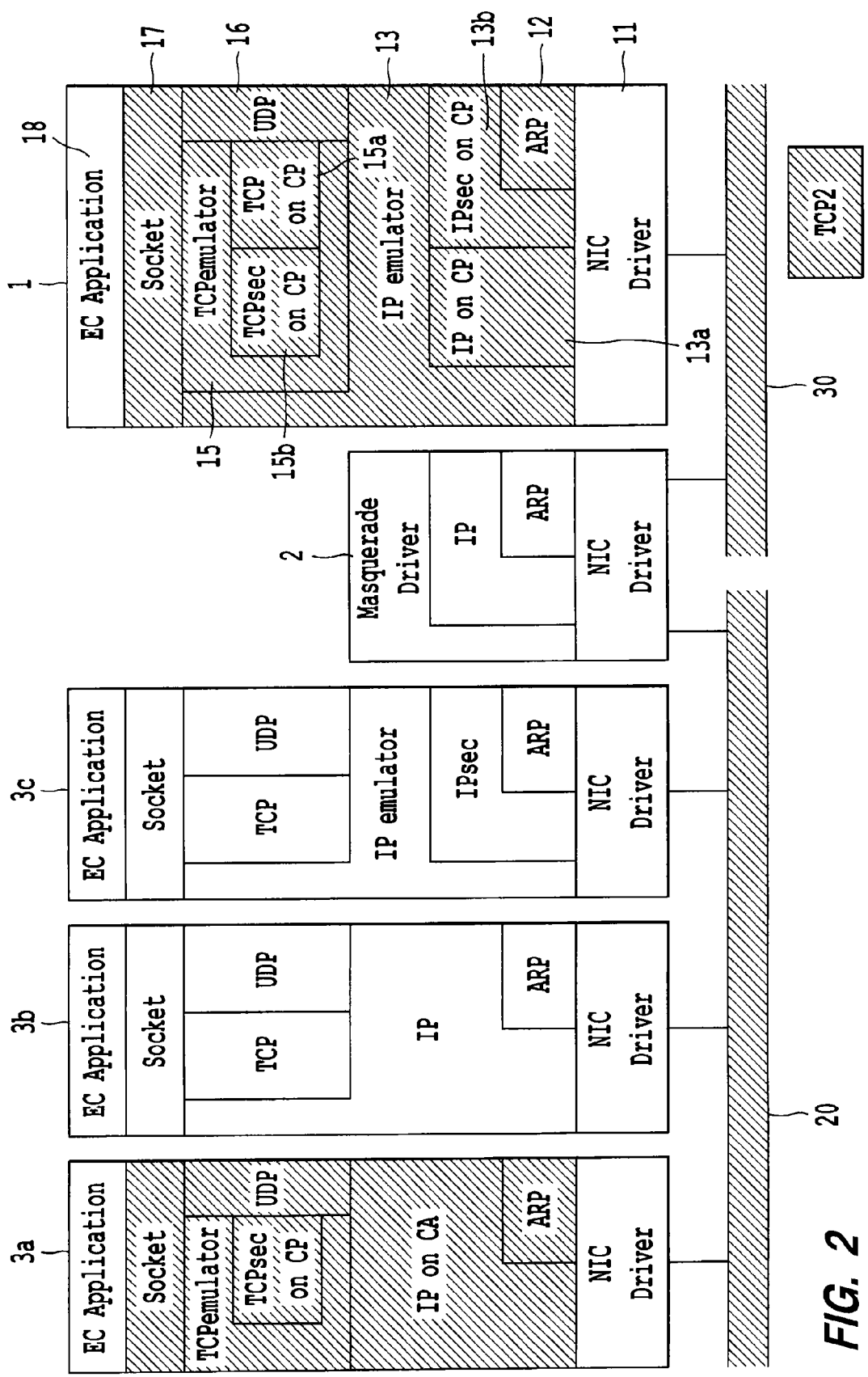
FIG. 2 is a communication layer diagram of a system in a first exemplified embodiment (EC application by TCPsec) of a communication system using the protocol according to the present invention.

Next, it will be explained according to FIG. 2 with respect to an encryption communication using an encryption system TCP$^2$ (particularly, TCPsec) which is a first exemplified embodiment of the present invention. FIG. 2 is an example of a communication to be applied particularly to an EC (Electronic Commerce: E-commerce) application.

FIG. 2 is a diagram showing a case when client terminals 3$a$, 3$b$ and 3$c$ for the EC application which are operably linked to a network 20 connect to a host computer (communication apparatus functioning as a server) operably linked to network 30 by way of a network control apparatus 2 such as a router or gateway.

The client terminal 3$b$ and the client terminal 3$c$ are not mounted with TCP$^2$ of the present invention. In other words, the client terminals 3$b$ and 3$c$ are not mounted with TCPsec or UDPsec which is an exemplary protocol for the encryption system of the present invention either. The client terminal which supports TCP$^2$ is 3$a$. Next, a communication between 3$a$ and 3$b$ is described.

Application software for the EC is mounted in an upper layer with respect to the socket of client terminals 3$a$ to 3$c$. Also, a host computer 1 connected to the network 30 is equipped with TCP$^2$ and EC application software 18 is mounted in an upper layer of its socket 17. Those skilled in the art will recognize that unused protocols, such as UDPsec or the like are omitted in FIG. 2, but the structure of the protocol stacks of the host computer 1 is equipped with all of the software constituting TCP$^2$ which is the protocol stack shown in FIG. 1.

More specifically, in host computer 1, first, a NIC driver (NIC driver) 11 is disposed across the first layer (physical layer) and the second layer (data-link layer) and an ARP (Address Resolution Protocol) 12 and an IP emulator 13 are disposed in the network layer of its upper layer (third layer). Then, the TCP emulator 15 and the UDP 16 are disposed in the transport layer of the fourth layer. The reason why there is no description of the UDP emulator (including UDPsec and UDP) in FIG. 2 is because TCPsec, with emphasis on error compensation rather than speed, is to be used for an encryption communication with respect to an EC application of the first exemplified embodiment. This does not mean that the host computer is not equipped with UDPsec. The fact that TCP$^2$ is equipped means that both of UDPsec and TCPsec are equipped.

The client terminals 3$a$, 3$b$ and 3$c$ are operably linked to the network 20 and the protocol stack of the network control apparatus 2 by way of the host computer 1 operably linked to the network 30 by an NIC driver.

Also, the client terminal 3$a$ is a terminal supporting TCP$^2$ of the present invention and here, protocol stacks are shown as a terminal comprising a communication apparatus having correspondence with only TCPsec. The client terminals 3$b$ and 3$c$ do not support TCP$^2$ of the present invention.

The client terminal 3$a$ is mounted with protocol driver software which is distributed beforehand through a network or through a recording medium as known to those skilled in the art. In addition, TCP/IP driver software is distributed beforehand similarly also with respect to the client terminal 3$b$ and the client terminal 3$c$ and is mounted thereon.

Particularly, with respect to the client terminal 3$c$, IPsec which is a conventional encryption system is mounted thereon and it is constituted such that IPsec cannot be used effectively, because the network control apparatus (router) 2 masquerades IP addresses (i.e., NAT) being referenced to a TCP port number. Further with respect to the client terminal 3$c$, it is constituted to cancel the connection request according to a network policy setting, not shown. It should be noted that those skilled in the art will recognize confirmation (receiving packet analysis or the like) itself of such a setting of the network policy, or, whether or not the protocol is mounted, so that the explanation thereof will be omitted in the present specification.

When the host computer 1 communicates with the client terminal 3$a$, the communication is to be carried out according to an encryption and decryption arrangement based on TCP$^2$ of the present invention and particularly on TCPsec, but when the host computer 1 communicates with the client terminal 3b or 3c, the communication is to be carried out in a condition that the encryption and decryption arrangement based on $TCP^2$ (particularly, TCPsec) of the present invention is not done. In other words, communication with 3b and 3c is carried out according to the typical TCP protocol. It is needless to say in a case when the host computer 1 communicates with the client terminal 3c supporting IPsec that an encryption communication based on IPsec can be carried out naturally. It should be noted that it is possible to stop the communication by the operation of $TCP^2$ which the host computer 1, even if the host computer 1 tries to communicate with the client terminal 3b or 3c not equipped with $TCP^2$.

Also, the host computer 1 and the client terminal 3a may carry out an exchange of an encryption and decryption software through a network according to this exemplified embodiment, but it is needless to say that it is also possible to configure communication peers beforehand by using a removable medium such as an FD, a CD, a UDB memory or the like. Likewise, $TCP^2$ may be incorporated into the operating system.

Figure 3:
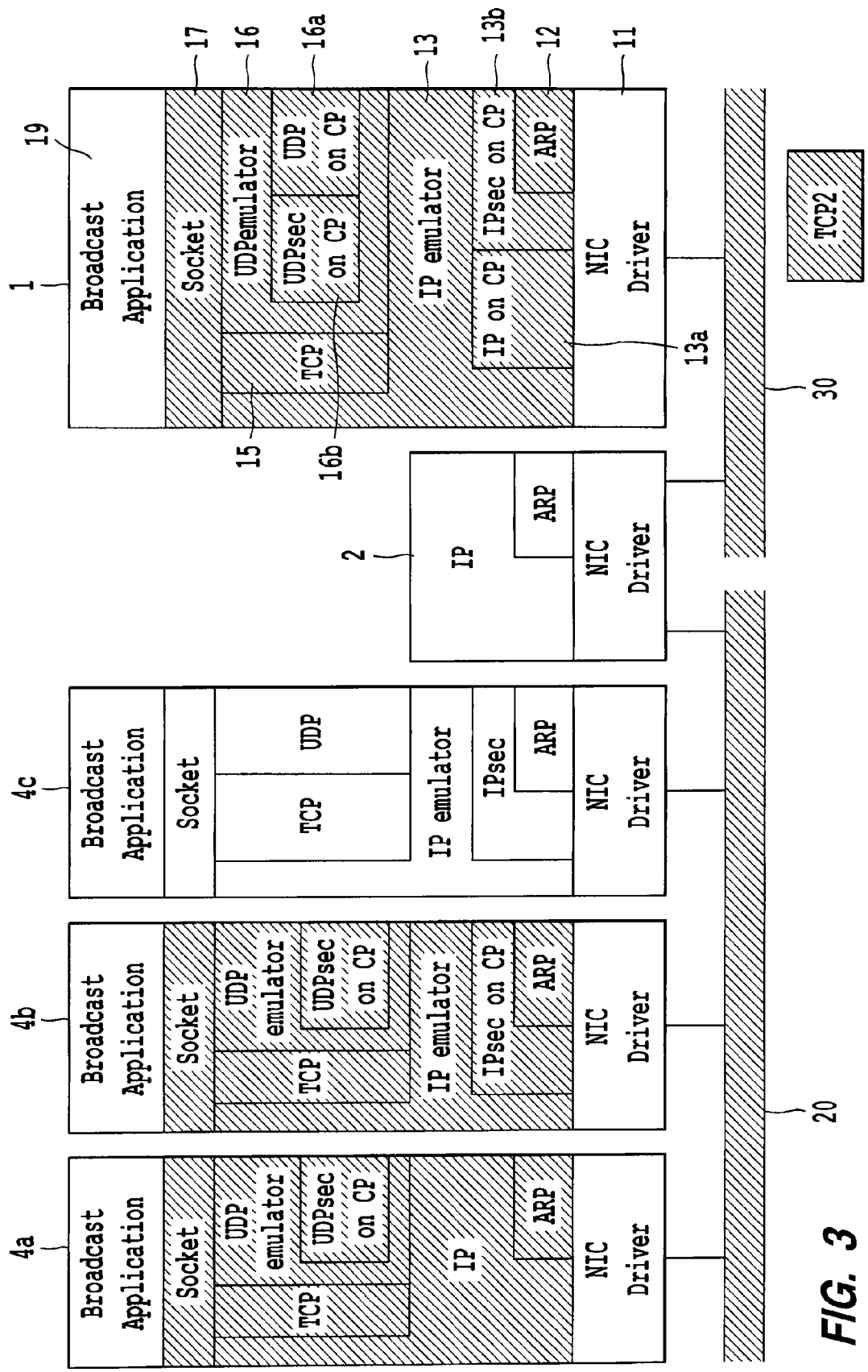
FIG. 3 is a communication layer diagram of a system in a second exemplified embodiment (broadcasting application by UDPsec) of a communication system using the protocol according to the present invention.

Next, it will be explained according to FIG. 3 with respect to encryption communication using an encryption system of UDPsec in $TCP^2$ which is a second exemplified embodiment of the present invention. FIG. 3 is a diagram showing a communication system where client terminals 4a, 4b and 4c for a broadcasting application which are connected to a network 20 communicate with a host computer (communication apparatus functioning as a server) 1 connected to other network 30 by way of a network control apparatus 2 such as a router or gateway.

FIG. 3 shows client terminals 4a, 4b and 4c and a protocol stack of the host computer 1. The client terminals 4a and 4b support $TCP^2$. In other words, only the terminals 4a and 4b are provided with UDPsec. Broadcast application software is mounted in an upper layer of a socket of each client terminal. In addition, the host computer 1 operably linked to the network 30 is also equipped with $TCP^2$ and broadcasting application software 19 is mounted in an upper layer of a socket 17 thereof. Similarly as with the host computer 1 of FIG. 2, the host computer 1 of FIG. 3 is also equipped with all of the software constituting $TCP^2$ which has a structure of the protocol stack of FIG. 1.

The protocol stack possessed by the host computer 1 are almost the same as the protocol stack of the host computer 1 in FIG. 2, the difference from the stack of FIG. 2 lies in that a UDP emulator 16 exists instead of a TCP emulator. This is due to the fact that a large amount of data of video or the like is handled in broadcasting application software to take advantage of the high speed characteristics of UDP.

The client terminals 4a, 4b and 4c are operably linked to the network 20 and the protocol stack of the network control apparatus 2 by way of the host computer 1 operably linked to the network 30 by an NIC driver.

Also, the client terminal 4a is a terminal supporting $TCP^2$ of the present invention and here, is a terminal provided with a communication apparatus having correspondence with only UDPsec, the client terminal 4b is a communication apparatus having correspondence with UDPsec of the present invention and with conventional IPsec. The client terminal 4c is a communication apparatus having correspondence only with conventional IPsec. The client terminal 4c does not support $TCP^2$ of the present invention. These client terminals 4a to 4c are mounted with protocol driver software which is distributed beforehand through a network or through a recording medium such as a CD-ROM, DVD, Memory Stick®, or the like, similarly as described relative to the client terminals 3a to 3c in FIG. 2.

With respect to the encryption and decryption logic for preventing data compromises and the authentication information addition and authentication logic for preventing "spoofing", it is necessary to make a correspondence between the host computer 1 and client terminals 4a, 4b and 4c. An arrangement according to a similar policy as that for conventional IPsec, but protocol driver software itself is distributed beforehand in the second exemplified embodiment of the present invention, so that it is also possible to arrange a secret key or the like by a more concise original protocol or to use packets having a simpler structure. Also, it is possible to mount encryption, decryption and authentication algorithm (logic) itself which is not publicly known encryption, decryption and authentication algorithm but independently created one as a software module of the protocol driver or the like.

It should be noted that the client terminal 4c is not mounted with $TCP^2$, but conventional IPsec, so that it is possible to make a secure communication. However, the clients 4a and 4b are mounted without IPsec but with UDPsec element of $TCP^2$ for the performance of the objective broadcasting application or as a matter of convenience in security policy. The reason why UDPsec is utilized instead of IPsec is that IPsec has lowered performance caused by the fact that a UDP port number portion (belonging to IP payload) is encrypted by IPsec or the like.

Also, by embedding a partner authentication protocol which judges whether or not the communication partner is correct into TCP of $TCP^2$ or UDP protocol stacks, that is, into TCPsec or UDPsec, it is possible to carry out a communication partner authentication function between communication partners bilaterally without being aware of a higher layer application. In this case, it is also possible to increase communication packet numbers, packet length or the like substantially within the range in which the cost metric associated therewith does not increase.

Also, in case of utilizing UDPsec which is an encryption system according to the exemplary embodiment of the present invention, when a broadcast function for transmitting data particularly toward unspecified number of partners (i.e., multicast) is carried out in the network, the client terminals 3a and 3b which receive the broadcast start negotiation (arrangement) obtain communication partner authentication or the secret key for communication. Then, it is not possible for the client terminal 3a and 3b to decrypt delivered data by UDPsec from the host computer 1 until the secret key for the communication is obtained after carrying out authentication of the communication partner.

Next, it will be explained according to FIG. 4 with respect to packet structures which are transmitted and received in the communication of the first and second exemplified embodiments, their encryption regions and the application regions of the completeness authentication according to the present invention.

Figure 4C:
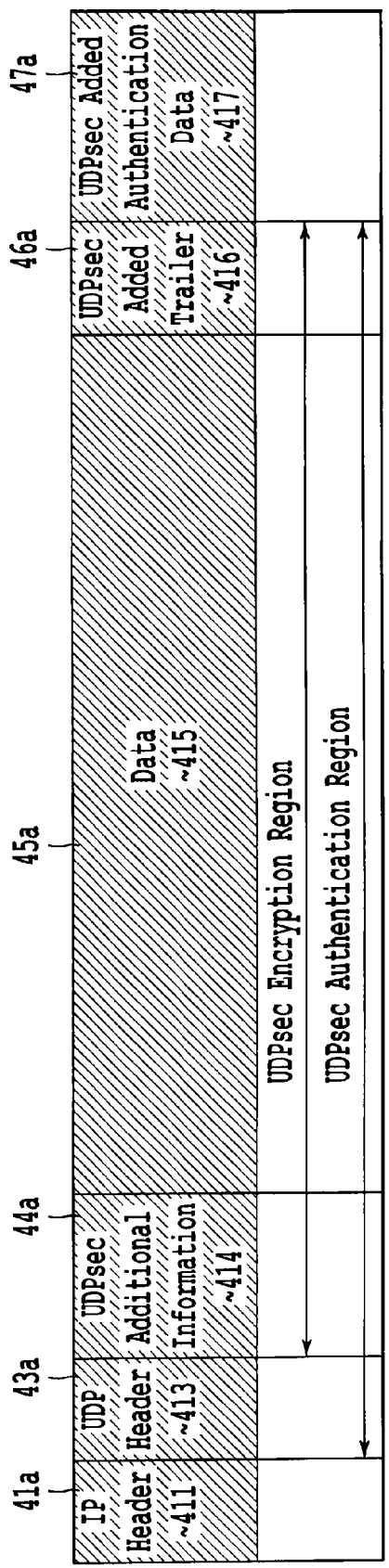
FIG. 4C is a diagram showing a packet structure of encryption regions and application regions of completeness authentication with respect to UDPsec/IP.

FIG. 4A shows a packet structure of TCPsec/IPsec and each encryption region and application region of completeness authentication, and FIGS. 4B and 4C respectively show TCPsec/IP, a packet structure of UDPsec/IP and encryption regions and application regions of completeness authentication.

As shown in FIG. 4A, the packet structure of TCPsec/IPsec has an IP header 41 just before an Encapsulating Security Payload (ESP) header 42 of IPsec. The ESP header is constituted such that a TCP header 43 and additional information 44 of TCPsec are provided subsequently and interposed therebetween with respect to application data 45. Then, a TCPsec trailer 46 is added, which is information for supporting cryptograph data such as a data blank occurring in block cryptograph, its blank length, and the number of the next header or the like. Thereafter, added authentication data 47 of TCPsec is disposed. Then, it is made to be a packet structure such that an ESP trailer 48 for IP and ESP authentication data 49 are disposed further thereafter.

Among those above, the portion shown by the numerals 41, 42, 48 and 49 is information for IPsec and the numeral 43, 44, 46 and 47 are information relating to TCPsec. TCPsec is also is disposed here according to IPsec; but, it should be noted that this utilization depends on employed encryption or algorithm of authentication even if the additional information 44 of TCPsec and the added trailer 46 are omitted or the added authentication data 47 of TCPsec is reduced.

In the packet structure of $TCP^2$ shown in FIG. 4A, the encryption is carried out by two systems of TCPsec and IPsec. In this case, first on the transmission side, the TCPsec is encrypted and TCPsec authentication data are added. Next, IPsec is encrypted and IPsec authentication data are added. Then, on the reception side, IPsec is decrypted, the received packet data is verified by the IPsec authentication data, subsequently the TCPsec side is decrypted and received packet data is verified by TCPsec authentication data.

In this manner, encryption is carried out by using two kinds of encryption algorithms of IPsec and TCPsec and further completeness authentication is carried out with respect to data having a packet structure as shown in FIG. 4A. In this way, it is possible to establish a strong encryption communication system, as compared with a system using only IPsec. The region encrypted by TCPsec is the application data 45 and the TCPsec added trailer 46, and, for the authentication region by TCPsec, the TCPsec additional information 44 is further added to aforesaid encryption region. It should be noted that the encryption region encrypted by conventional IPsec is only a portion from the TCP header 43 until the ESP trailer 48 and its authentication region becomes a region from the ESP header 42 until the ESP trailer 48.

FIG. 4B shows a packet structure of TCPsec/IP which is different from FIG. 4A and the structure thereof is made such that the TCP header 43 and the TCPsec additional information 44 follows just after the IP header 41 and before the application data 45. Then, it is constituted such that the added trailer 46 of TCPsec, which is information for supporting cryptograph data of a data blank occurring in the block cryptograph, its blank length, the number of next header or the like, and, the added authentication data 47 of TCPsec are disposed thereafter.

Here, the numerals 43, 44, 46 and 47 become characteristic information for TCPsec. However, as mentioned above, it is possible depending on the employed encryption/authentication algorithm to disperse this of information into unused header field portions of TCPsec/IP or the like or to omit them by a dependent and prior arrangement (negotiation) which cannot be reassembled or determined from the individual packet. Also, by constituting TCPsec/IP packets as shown in FIG. 4B using a protocol field which does not use TCP and IP corresponding to an upper layer of the IP layer, it becomes possible to reduce the packet length easily as compared to an IPsec packet which is focused only on IP of a lower layer. It should be noted that the encryption region here is the application data 45 and the TCPsec added trailer 46. The authentication region is added with the additional information 44 of TCPsec apart from the encryption region.

FIG. 4C shows a packet structure of UDPsec/IP, including a UDPsec additional information 44a, a UDPsec added trailer 46a and a UDPsec added authentication data 47a for supporting UDPsec functionality. This encryption region is an application data 45a and a UDPsec added trailer 46a. The authentication region is added with the UDPsec additional information 44a apart from the encryption region.

Next, it will be explained with respect to the operation of the encryption process system using TCPsec which is a first exemplified embodiment of the present invention according to flowchart diagrams shown in FIGS. 5 and 6 and FIGS. 8 to 14 and a sequence diagram shown in FIG. 7.

Any processes descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art.

FIG. 5 is a process flowchart diagram in TCP and TCPsec passive-open (Open of connection waiting which corresponds to a host B of FIG. 7 and, for example, Web server opens on this condition.) and this TCP/TCPsec passive-open process starts in a case when connection waiting is opened in a higher layer application-program (step S1). It should be noted that when describing FIG. 7, a process on the host B side corresponds to this figure.

First, analysis of a port number to be opened is carried out first (step S2). In this analysis, for example, its definition condition is confirmed by using a TCP port No. 80 in the case of Web server. Then, it is judged next whether or not this port No. 80 is permitted for TCPsec passive-open (step S3). In a case when TCPsec passive-open is not permitted in step S3, it is judged this time whether or not TCP passive-open is permitted (step S4). In a case when TCP passive-open is not permitted in judging step S4 either, not only TCPsec but also TCP are found not to be permitted and TCP/TCPsec passive-open fails, so that the process will be discontinued (step S7).

In a case when TCP passive-open is permitted in judging step S4, more specifically when TCP passive-open is permitted while TCPsec passive-open is not permitted, TCP passive-open process shown in FIG. 8 to be described hereinafter will be executed (step S5).

In a case when permission condition of TCPsec passive-open is confirmed in judging step S3, similarly TCPsec passive-open process shown in FIG. 9 to be described hereinafter will be executed (step S6).

When the TCP passive-open process or the TCPsec passive-open process in step S5 or step S6 is ended, the TCP/TCPsec passive-open process will end (step S7). In this manner, passive-open is carried out by TCP from an application of a higher layer in the present example based on the judgment of $TCP^2$, if TCPsec is supported, a communication is to be carried out by TCPsec and if TCPsec is not supported, a communication is carried out by TCP.

Figure 6:
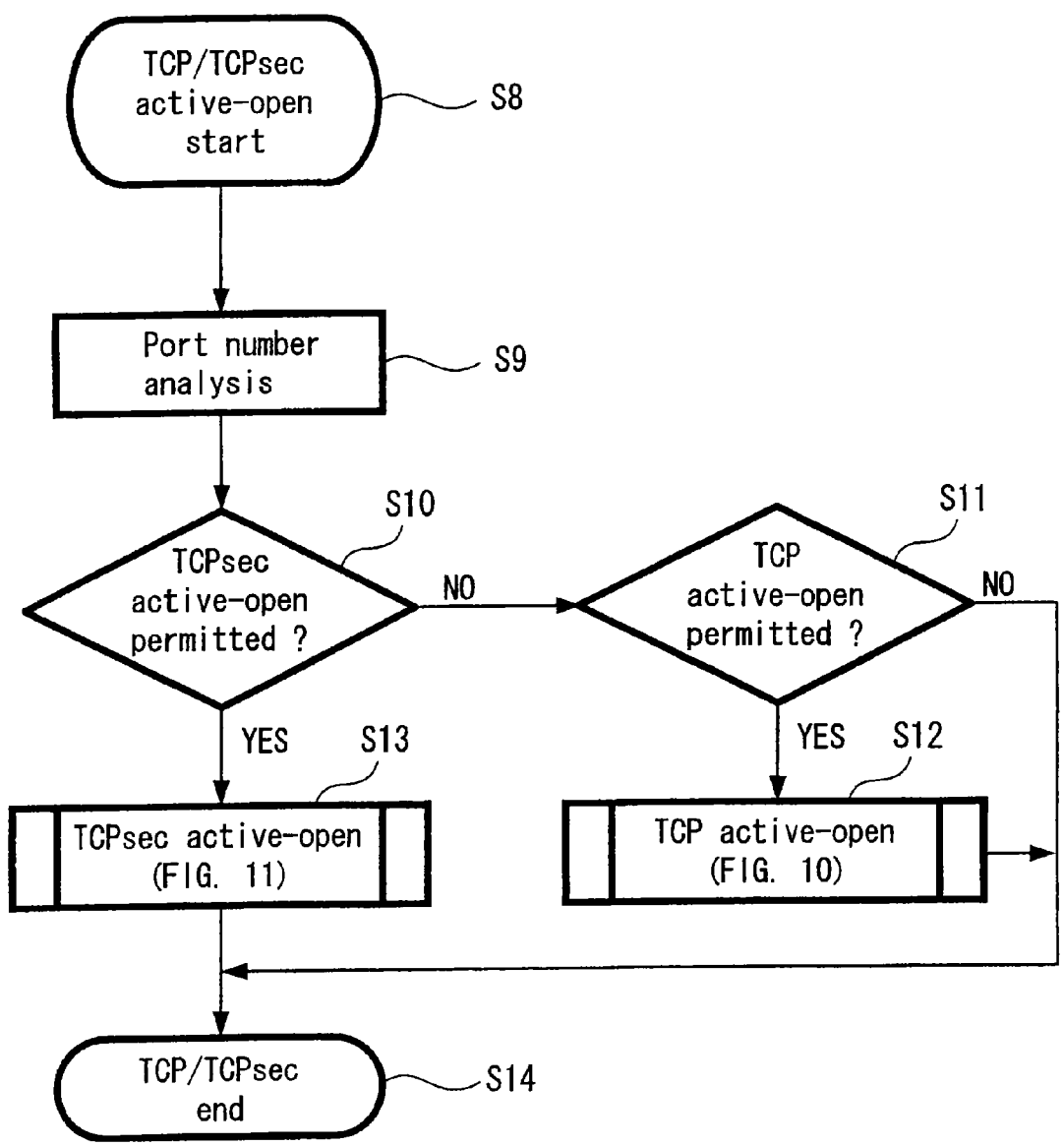
FIG. 6 is a flowchart diagram showing a TCP/TCPsec active-open process according to an exemplary embodiment of the present invention.

Next, it will be explained according to FIG. 6 with respect to an active-open process of TCP and TCPsec of the present invention. The active-open of TCP/TCPsec means an open of a connection request and, for example, a client terminal mounted with a Web browser is to be opened on this condition. With reference to FIG. 7, a process on the host A side corresponds thereto. FIG. 6 is a flowchart diagram of a process in this active-open and in a case when a connection request open is performed in a higher layer application-program, an active-open process of this TCP/TCPsec is made to start (step S8).

First, an analysis of a port number to be opened is carried out (step S9). This analysis confirms definition condition of a TCP port No. 3000 in a case when, for example, a client terminal application mounted with a Web browser tries to use the TCP port No. 3000.

Next, it is judged whether or not TCPsec active-open is permitted with respect to the port No. 3000 (step S10). In a case when it is judged in step S10 that the TCPsec active-open is not permitted, it is judged subsequently whether or not TCP active-open is permitted (step S11). In a case when TCP active-open is not permitted in judging step S11 either, either one of TCPsec and TCP active-open was not to be permitted and the TCP/TCPsec active fails, so that a connect process is discontinued (step S14).

In a case when TCP active-open is permitted in judging step S11 and more specifically, when TCP active-open is permitted while TCPsec active-open is not permitted, a TCP active-open process shown in FIG. 10 to be described hereinafter will be executed (step S12).

In a case when permission condition of TCPsec active-open is confirmed in judging step S10, a TCPsec active-open process shown in FIG. 11 to be described hereinafter will be executed (step S13).

When the TCPsec active-open process of step 12, or, the TCPsec active-open process of step S13 is ended, the TCP/TCPsec active-open process is ended (step S14). Also in case of TCP/TCPsec active-open, active open is carried out by TCP from an application of a higher layer similarly as the case of TCP/TCPsec passive-open (FIG. 5), and according to the judgment of $TCP^2$, a communication is carried out by TCPsec if TCPsec is supported and a communication is to be carried out by TCP if TCPsec is not supported.

Next, a communication process using TCPsec of an exemplary embodiment of the present invention will be explained with respect to a sequence process between a host A on the active-open side and a host B on the passive-open side according to FIG. 7.

FIG. 7B illustrates a connection sequence of TCPsec, a data communication sequence, and, a cutoff sequence in comparison with standard TCP shown in FIG. 7A

As shown in FIG. 7A, an application of the host B is TCP passive-open and an application of the host A is TCP active-open in the standard TCP configuration.

When the application of the host B becomes TCP passive-open, a TCP passive-open process (see step 5 of FIG. 5 and FIG. 8) is started and is awaited reception as shown in step S15 of FIG. 8 to be described hereinafter. When the application of the host A becomes TCP active-open, a TCP active-open process (see step S12 of FIG. 6 and FIG. 10) is started. The TCP active-open provides a connection request (SYN) from the host A with respect to host B as shown in step S52 of FIG. 10 to be described hereinafter. In this manner, the connection sequence of the standard TCP is started.

On the host B side, when this connection request (SYN) is received, a receiving packet analysis of this connection request is ended and a connection response (SYN/ACK) is transmitted to the host A side. Here, (ACK) is abbreviation of Acknowledgement, which is transmitted when data transfer is ended normally. On the host A side, when this connection response (SYN/ACK) is received, ACK (acknowledgment) that a connection is completed is transmitted and the connection sequence of the standard TCP is ended.

When ending the connection sequence of standard TCP, a data communication sequence by standard TCP becomes effective and data transmitting and receiving is carried out. Communication includes repeating a fundamental pattern such that ACK (acknowledgment) is returned from the side which received data after either one of the host A side and the host B side transmits data.

In this data communication sequence of the standard TCP, it is possible for either one of the host A and the host B to carry out a cutoff request with respect to its partner.

FIG. 7A illustrates a case in which a cutoff request is transmitted from the host A on the active-open side with respect to the host B on the passive-open side. When there is a cutoff request from the application of the host A, the host A transmits a cutoff request (FIN). When the host B receives this cutoff request (FIN), it transmits a cutoff response (FIN/ACK) as shown in step S23 of FIG. 8 to be described hereinafter. The host A transmits ACK (acknowledgment) when it receives this cutoff response (FIN/ACK) and the cutoff sequence of the standard TCP is ended.

Next, a communication sequence by TCPsec of the exemplary embodiment of the present invention will be explained according to FIG. 7B. In FIG. 7B, the application of the host B is TCPsec passive-open and the application of the host A is TCPsec active-open.

When the application of the host B becomes TCPsec passive-open, a TCPsec passive-open process (see step S6 of FIG. 5 and FIG. 9) is started and it becomes a condition of waiting for reception as shown in step S31 of FIG. 9 to be described hereinafter. When the application of the host A becomes TCPsec active-open, a process of TCPsec active-open (see step S13 of FIG. 6 and FIG. 11) is started, a connection request (SYN) is transmitted from the host A with respect to the host B as shown in step S69 of FIG. 11. In this manner, the TCPsec connection sequence is started. It should be noted that $TCP^2$ may include adding encrypted inherent information to the connection request (SYN) in an alternative embodiment so as to notify the TCPsec peer that a verified TCPsec peer is communicating. Such inherent information may include hardware/software information, such as serial numbers, version, release numbers, and the like. In this way, it is possible to confirm whether or not the terminal is a $TCP^2$ peer correct before subsequent TCPsec negotiation data is exchanged between the host A and the host B.

When the connection request (SYN) transmitted from the host A is received on the host B side, a connection response (SYN/ACK) is transmitted with respect to the host A. Then, the host A side transmits ACK (acknowledgment) when the connection response (SYN/ACK) is received from this host B. Subsequently, TCPsec negotiation data are exchanged between the host A and the host B and the TCPsec connection sequence is ended.

When this connection sequence is ended, a TCPsec data communication sequence becomes effective and after either one of the host A side and the host B side transmits data, data transmission and reception are carried out by repeating a pattern in which ACK (acknowledgment) is returned from data receiving side. Here, the data are all cryptograph data.

It should be noted in the TCPsec data communication sequence that it is possible for either one of the host A and the host B to make a cutoff request with respect to the other partner. In FIG. 7B, the cutoff is started from the host A of the active-open side. When there is a cutoff request from the application of the host A, the host A transmits a cutoff request (FIN). In an alternative embodiment, encrypted inherent information may be added to this cutoff request (FIN). When the host B receives this cutoff request (FIN), it transmits, in case the case of a correct $TCP^2$ partner, a cutoff response (FIN/ACK) as shown in step S42 of FIG. 9 to be described hereinafter. When the host A receives this cutoff response (FIN/ACK), it transmits ACK (acknowledgment) and the TCPsec cutoff sequence is ended.

As mentioned above, the sequence from the connection to the cutoff of the communication was explained according to FIG. 7 with respect to standard TCP and TCPsec hereinafter, the sequence will be explained with respect to passive-open processes and active-open processes of TCP and TCPsec in the order thereof according to a flowchart of FIG. 8.

First, it will be explained in step S5 of the flowchart diagram in FIG. 5 with respect to details in a case when a TCP passive-open process starts according to a flowchart diagram of FIG. 8.

Figure 8:
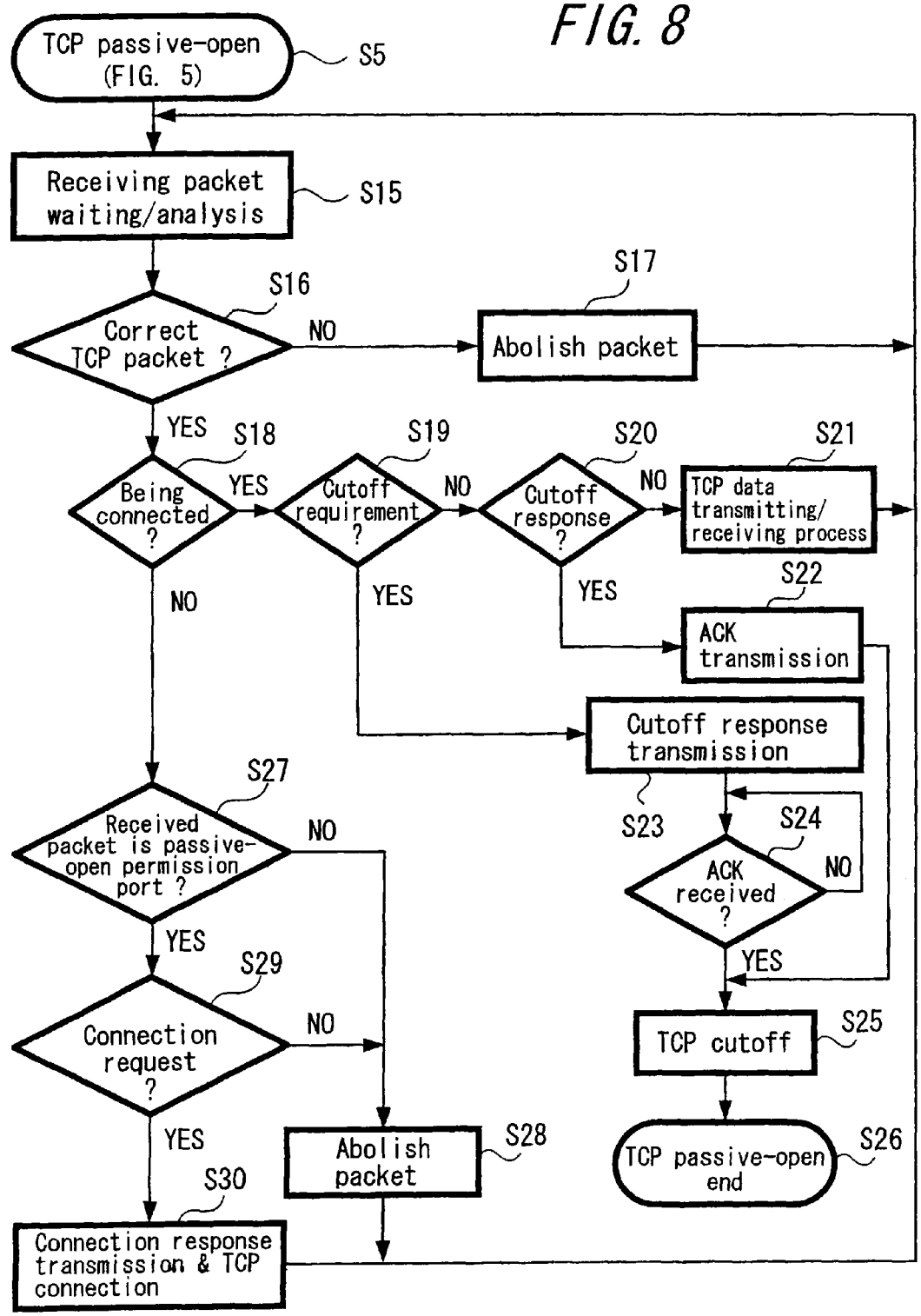
FIG. 8 is a flowchart showing detail of a TCP passive-open process S5 in FIG. 5.

In a case when the protocol processed in step S5 of FIG. 5 is determined to be TCP, a TCP passive-open process of FIG. 8 starts. First, reception of data is awaited and analysis of a received packet is carried out (step S15). Subsequently, it is judged whether or not this received packet is a correct packet, in other words, whether or not it is a TCP protocol attack pattern, such as a DoS attack (step S16). Then, in a case when it is judged that the packet is improper as a result of the judgment of step S16, the received packet is discarded (step S17) and reception of a next packet is awaited.

Figure 7:
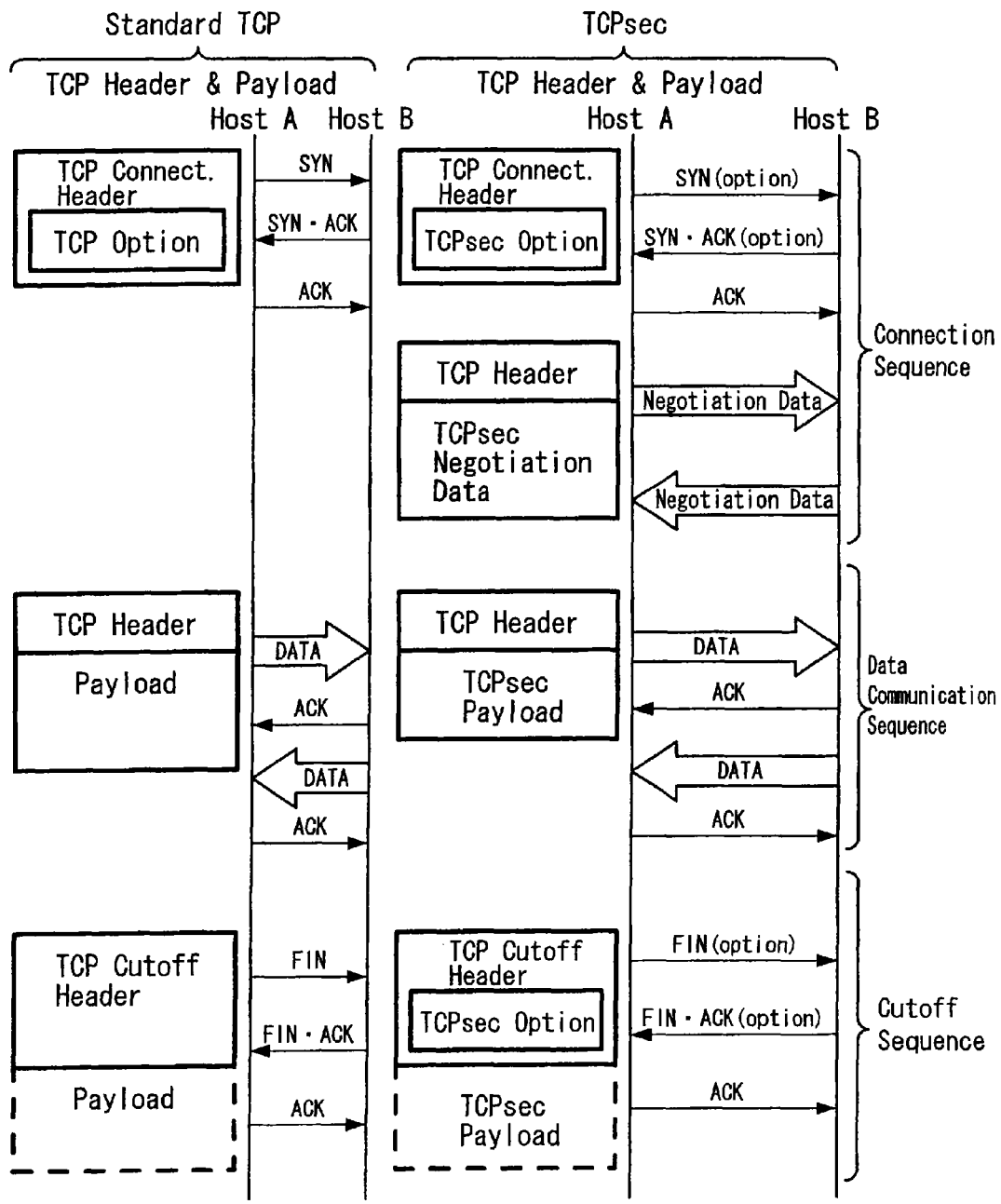
FIG. 7A is a sequence diagram showing a communication interaction between a standard TCP and a host A (active-open) of TCPsec according to an exemplary embodiment of the present invention.
FIG. 7B is a sequence diagram showing a communication interaction between a standard TCP and a host B (passive-open) of TCPsec according to an exemplary embodiment of the present invention.

In a case when it was judged in judging step S16 that the received packet is a correct TCP packet, it is judged subsequently whether or not it is connected, in other words, whether or not the connection sequence of the host A and the host B in FIG. 7 is completed (step S18). In a case when it is judged in judging step S18 that it is connected, it is judged next whether or not the packet is for a cutoff request (FIN of FIG. 7A) (step S19). If it is not for a cutoff request, it is judged subsequently whether or not it is for a cutoff response (FIN/ACK of FIG. 7A) (step S20). In a case when it is neither for a cutoff request nor for a cutoff response, a transmitting and receiving process of TCP data is performed (step S21), and in a case when the received packet is for a cutoff response, ACK is transmitted from the host A of FIG. 7 and TCP connection will be cutoff (step S25). When it is judged in judging step S19 that it is a cutoff request from the host A, a cutoff response is transmitted from the host B with respect thereto (step S23).

In a case when a cutoff response is transmitted in step S23, final ACK will be awaited (step S24). Then, TCP will cutoff after the final ACK is received (step S25), and the TCP passive-open is ended (step S26).

In a case when it is judged in judging step S18 that the receiving port is not in a connected condition, it is judged whether or not the received packet is a passive-open permission port (step S27). Then, in a case when the received packet is not permitted, the received packet is discarded (step S28) and a next packet will be awaited. Also, in a case when it is judged in judging step S27 that the received packet is of passive-open permission, it is judged whether or not the next packet is a connection request (step S29), and in a case when it is not a connection request, the packet is discarded (step S28) and a next packet will be awaited. Also, in a case when it is judged as a connection request in judging step S29, a connection response is transmitted and it will be made to be a TCP connecting condition (step S30).

Next, it will be explained according to a flowchart diagram of FIG. 9 with respect to details of the process step S6 in TCPsec passive-open of FIG. 5. As shown in step S6 of FIG. 5, this process is a process when the received packet is determined to be a TCPsec. First, reception of data awaited and a received packet is analyzed (step S31). Subsequently, it is judged whether or not this received packet is a correct packet, in other words, whether or not it is a TCP protocol attack pattern, such as a DoS attack (step S32). Then, in a case when it is judged as an improper packet as a result of the judgment of this step S32, the received packet is discarded (step S33), the flow returns to step S31 and receiving of a next packet will be awaited.

In a case when it is judged in judging step S32 that the received packet is a correct packet, it is judged subsequently whether or not the connection of the host A and the host B is completed (whether or not being connected) (step S34). In a case when it is judged in judging step S34 that the host A and the host B are connected, it is judged next whether or not the received packet is a cutoff request (FIN) (step S35). If it is not a cutoff request, it is judged whether or not the received packet is a cutoff response (FIN/ACK) (step S36). Then, in a case when the received packet is neither a cutoff request nor a cutoff response, a TCPsec data transmission and reception process, shown in FIG. 12 to be described hereinafter, is carried out (step S37) and the flow proceeds to step S49. Next, in a case when there is a cutoff response in judging step S36, it is judged whether or not the cutoff key coincides (step S38). Here, the cutoff key means a common key (secret key) in a negotiation between the host A and the host B for a connection sequence of FIG. 7, whose negotiation was concluded and it is made possible to cutoff a communication between both sides only when this key coincides. In a case when the cutoff key coincides in judging step S38, ACK is transmitted (step S39) and TCPsec between the host A and the host B is cutoff (step S44). In a case when the cutoff key does not coincide in judging step S38, the packet is discarded as an improper packet (step S41) and a next receiving packet will be awaited. In addition, also in a case when it is judged in judging step S35 that the received packet is a cutoff request (FIN), it is judged whether or not the cutoff key coincides (step S40). Then, in a case when the cutoff key does not coincide, the received packet is discarded as an improper packet (step S41), and in a case when the cutoff key coincides, a transmission of a cutoff response (FIN/ACK) is carried out (step S42). In a case when a cutoff response was transmitted in step (S42), final ACK from the partner is awaited (step S43), and when this final ACK is received, TCPsec is made to be in a cutoff condition (step S44) and the TCPsec passive-open is ended (step S45).

In a case when it is judged in judging step S34 that the host A and the host B are not connected, it is judged whether or not the received packet is a passive-open permission port (step S46). Then, in a case when the received packet is not a passive-open permission port, the received packet is discarded (step S47), the flow returns to step S31 and a next packet will be awaited. Also, in a case when it is judged in judging step S46 that the received packet is to be a passive-open permission port, a TCPsec passive connection process shown in FIG. 13 to be described hereinafter is executed (step S48).

Subsequently, it is judged according to the common key and the authentication data whether or not the communication partner is normal, in other words, whether or not it is a partner possessing right authority (step S49). If it is judged as a normal partner, the flow returns to step S31 and a next receiving packet is awaited, but if it is judged that the communication partner is not a normal partner, the TCPsec connection is cutoff (step S50) and the TCPsec passive-open process is ended (step S51).

Next, it will be explained according to a flowchart diagram of FIG. 10 with respect to a TCP active-open process shown in step S12 of FIG. 6.

Figure 10:
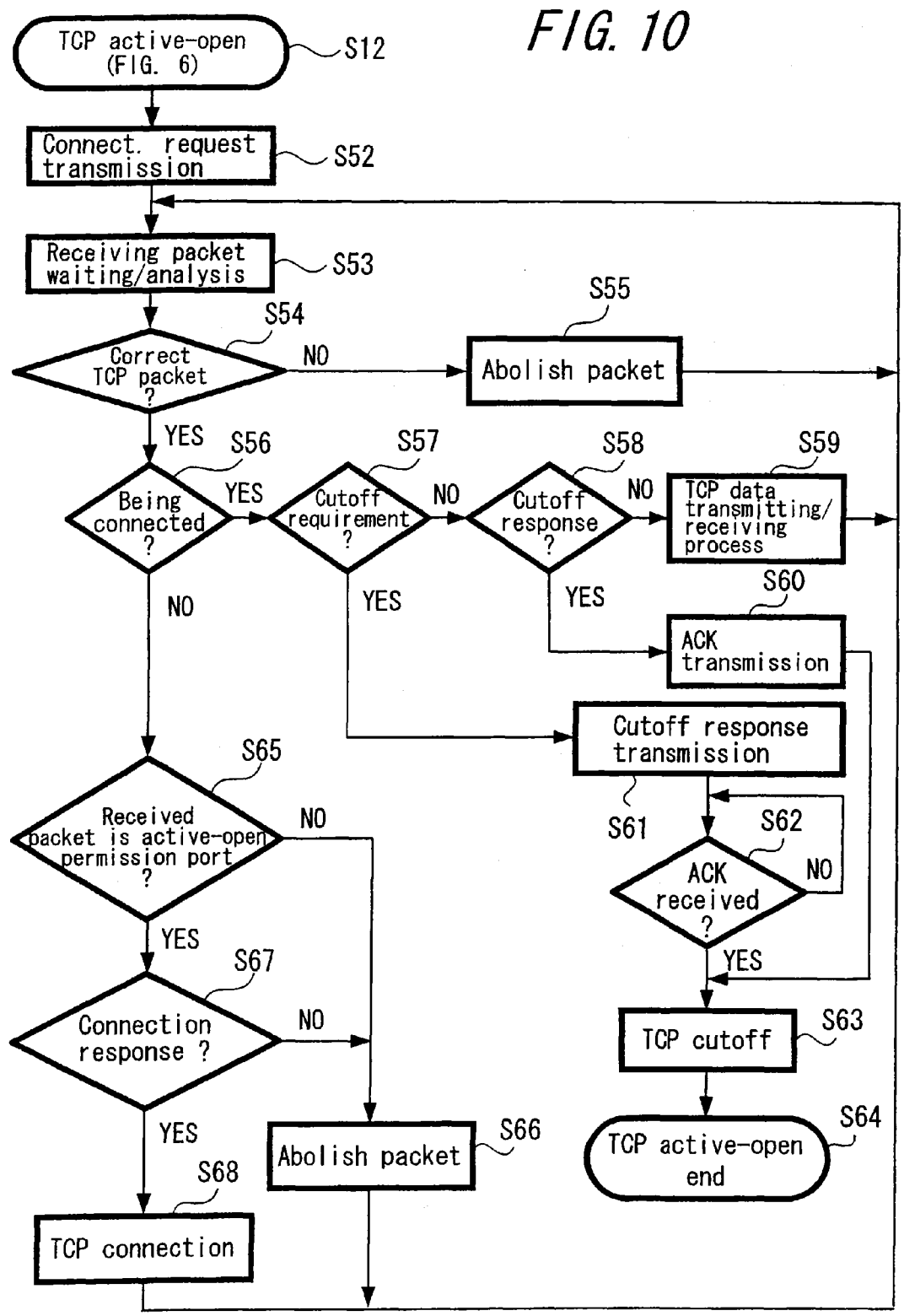
FIG. 10 is a flowchart showing detail of a TCP active-open process S12 in FIG. 6.

FIG. 10 is a flowchart illustrating a TCP process when the protocol in FIG. 6 is determined to be TCP. A connection request (SYN) is transmitted from the transmission side host A with respect to the reception side host B (step S52). When a connection response (SYN/ACK) with respect to this connection request is transmitted from the reception side host B, reception is awaited and analysis of the received packet is carried out (step S53). Next, it is judged whether or not this received packet is a correct packet, in other words, whether or not it is a TCP protocol attack pattern, such as a DoS attack (step S54). In a case when it is judged as a result of the judgment in step S54 that it is an improper packet, the received packet is discarded (step S55), the flow returns to step S53 and reception of a next packet will be awaited.

In a case when it is judged in judging step S54 that the received packet is a correct packet, it is judged subsequently whether or not the transmission side (active side) host A and the reception side (passive side) host B are in a connected condition (step S56). In a case when it is judged in this judging step S56 that they are connected, it is judged next whether or not the received packet is a cutoff request from the transmission side host A with respect to the reception side host B (step S57). If this is not a cutoff request, it is judged whether or not it is a cutoff response (FIN/ACK) from the reception side host B with respect to the transmission side host A (step S58). If it becomes neither a cutoff request nor a cutoff response, a TCP data transmitting and receiving process is carried out (step S59) and a next receiving packet is awaited. If it is judged as in judging step S58 that it is a cutoff response from the host B to the host A, the host A transmits ACK for affirming the cutoff (step S60) so as to cutoff TCP (step S63).

In a case when the received packet is a cutoff request in judging step S57, a cutoff response is transmitted from the host B with respect to the host A (step S61) and the host B waits for the reception of the final ACK from the host A (step S62). Then, TCP cutoff after host B receives the final ACK from the host A (step S63) and the TCP active-open is ended (step S64).

In a case when it is judged in judging step S56 that the transmission side host A and the reception side host B is not in a connected condition, it is judged whether or not the received packet is an active-open permission port (step S65). Then, in a case when the received packet is not permitted, the received packet is discarded (step S66) and a next packet is awaited. Also, in a case when it is judged in judging step S65 that the received packet is to be active-open permission, it is judged whether or not there was a connection response from the reception side host B (step S67), and, if there is no connection response, the packet is discarded (step S66) and a next packet awaited. In a case when a connection response is provided from the reception side host B, a TCP connection is made (step S68), the flow returns to step S53 and a next receiving packet will be awaited.

Next, it will be explained according to a flowchart diagram of FIG. 11 in a case when a TCPsec active-open in step S13 of FIG. 6 is started.

Figure 11:
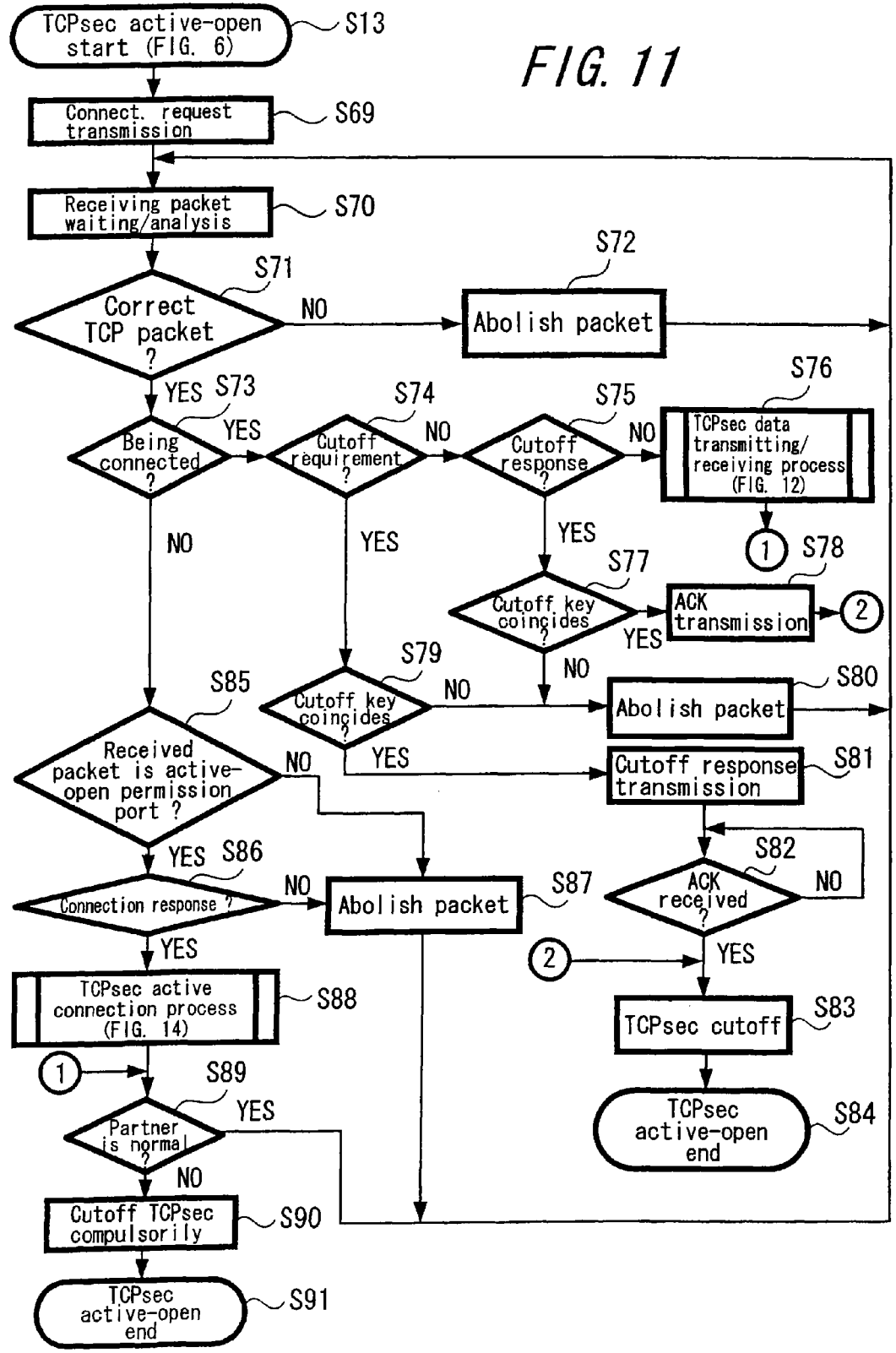
FIG. 11 is a flowchart showing detail of a TCPsec active-open process S13 in FIG. 6.

The process shown in the flowchart diagram of FIG. 11 starts in a case when the protocol processed in step S13 of FIG. 6 is determined to be TCPsec. First, a connection request (SYN) is transmitted from the transmission side host A with respect to the reception side host B (step S69). On the other hand, when there is a connection response (SYN/ACK) from the reception side host B, reception of a packet starts and analysis of the received packet is carried out (step S70).

Next, it is judged as a result of the received packet analysis whether or not the received packet is a correct TCP packet and more specifically, whether or not it is not a TCP protocol attack pattern, such as a DoS attack (step S71). In a case when it is judged as this result that it is an improper packet, that packet is discarded (step S72), the flow returns to step S70 and a next packet is awaited.

Figure 12:
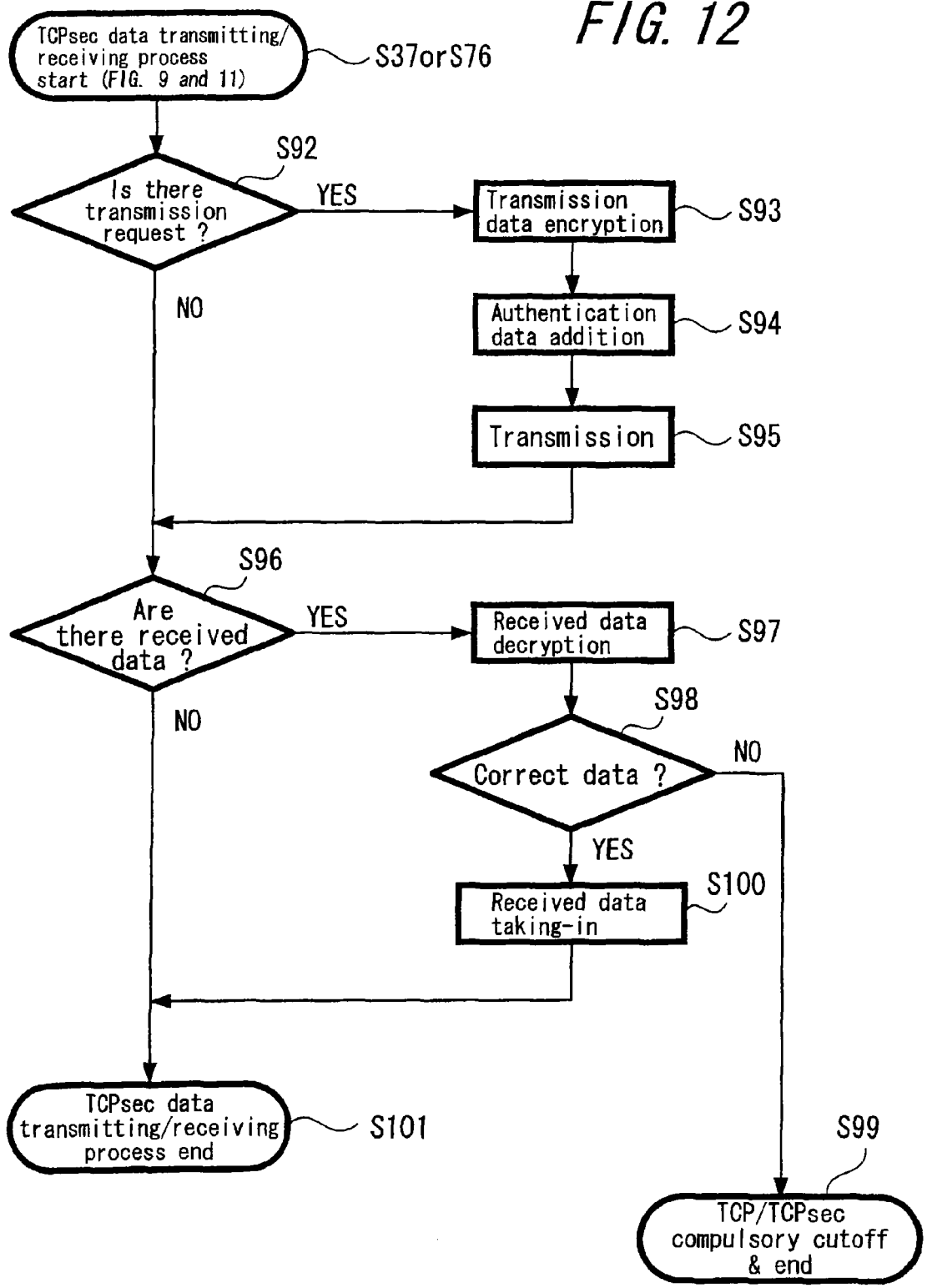
FIG. 12 is a flowchart showing detail of a TCPsec transmitting and receiving process S76.

When it is judged in judging step S71 that the received packet is a correct TCP packet, it is judged whether or not the connection of the transmission side host A and the reception side host B is completed (whether or not being connected) (step S73). Then, if the host A and the host B is in connected condition, it is judged whether or not the received packet is a cutoff request (FIN) (step S74). When the received packet is not a cutoff request, it is judged whether or not there is a cutoff response from the reception side host B (step S75). In a case when there is neither a cutoff request nor a cutoff response, a TCPsec data transmitting and receiving process shown in FIG. 12 is carried out (step 76) and thereafter, the flow proceeds to step S89.

In a case when there was a cutoff response in judging step S75, it is judged whether or not the cutoff key coincides (step S77). With respect to this cutoff key, it is all the same as that explained in FIG. 9. In a case when the cutoff key coincides in judging step S77, ACK is transmitted from the transmission side host A with respect to reception side host B (step S78) and TCPsec between the host A and the host B is cutoff (step S83). In a case when the cutoff key does not coincide in judging step S77, the packet is discarded as an improper packet (step S80) and a next receiving packet is awaited. In addition, also in a case when it is judged in judging step S74 that the received packet is a cutoff request (FIN), it is judged whether or not the cutoff key coincides (step S79). Then, in a case when the cutoff key does not coincide, the received packet is discarded as an improper packet (step S80), and in a case when the cutoff key coincides, transmission of a cutoff response (FIN/ACK) is carried out (step S81). In a case when a cutoff response is transmitted in step S81, the final ACK from the partner awaited (step S82) and when this final ACK is received, TCPsec is made to be a cutoff condition (step S83) and the TCPsec active-open is ended (step S84).

Figure 14:
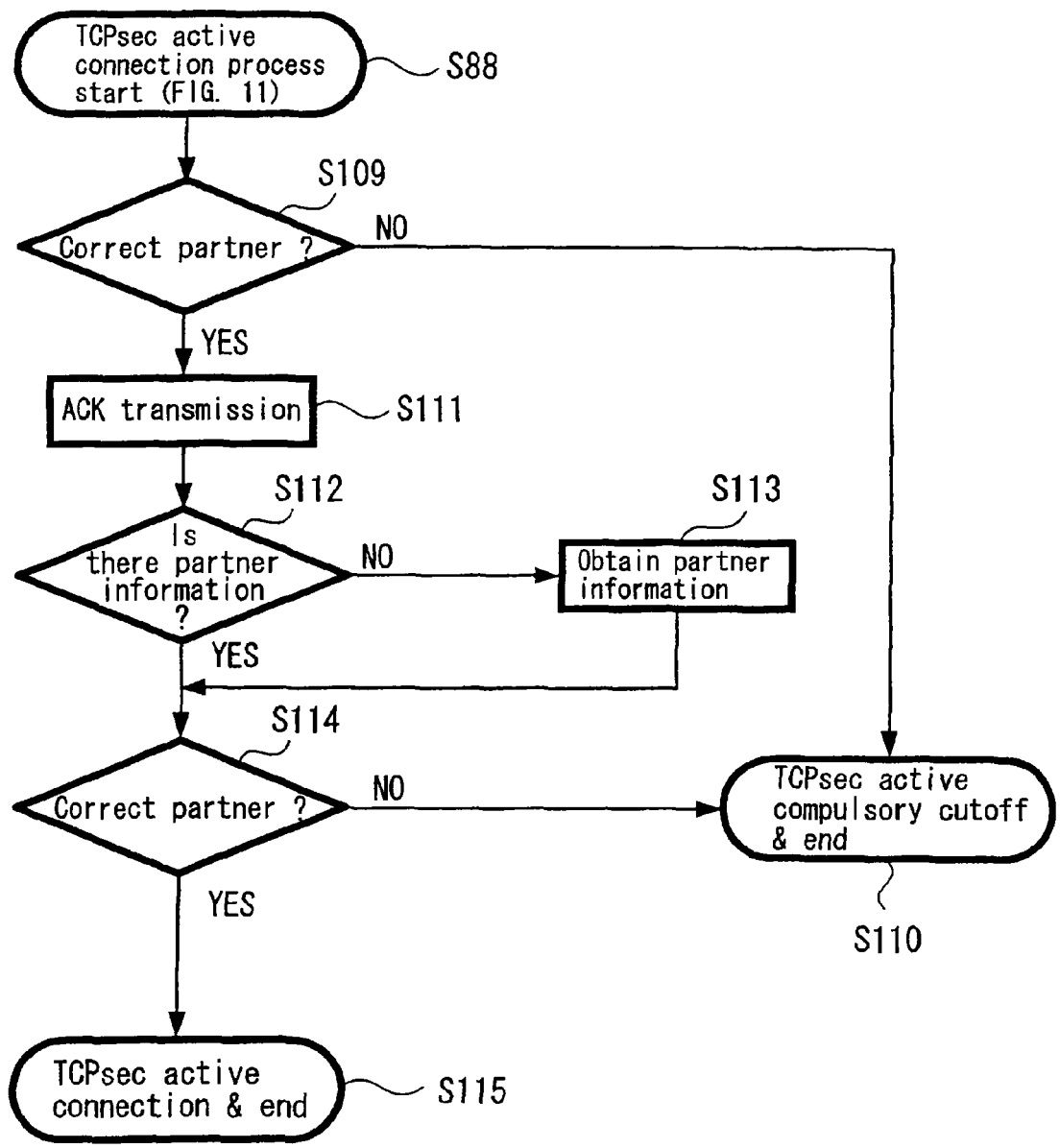
FIG. 14 is a flowchart showing detail of a TCPsec active connection process S88 in FIG. 11.

In a case in judging step S73 when a connection of the transmission side host A and the reception side host B is not completed, that is, not being connected, it is judged whether or not the received packet is an active-open permission port (step S85). Then, in a case when the received packet is not permitted, that received packet is discarded (step S87), the flow returns to step S70 and a next packet is awaited. Also, in a case when the received packet is judged to be of an active-open permission in judging step S85, it is judged whether or not the received packet is a packet of a connection response (SYN/ACK) from the reception side host B (step S86), and in a case when it is not a packet of a connection response, the packet is discarded (step S87) and a next packet is awaited; and, in a case when it is judged as a connection response packet in judging step S86, a TCPsec active connection process the detail of which is shown in FIG. 14 is carried out (step S88).

When the TCPsec active connection process is performed in step S88, it is judged next whether or not the reception side host B is a normal partner, in other words, whether or not it is a partner for which the connection is permitted (step S89). Then, if it is judged as a partner for which the connection is allowed, the flow returns to step S70, a next packet reception is waited for, and when it is judged in step S89 that it is a partner for which the connection is not permitted, the transmitting and receiving by TCPsec is cutoff (step S90) and the TCPsec active-open is ended (step S91).

Next, it will be explained according to a flowchart diagram of FIG. 12 with respect to details of a TCPsec data transmitting and receiving process in a case when step S37 of FIG. 9 and step S76 of FIG. 11 mentioned above are selected.

Figure 9:
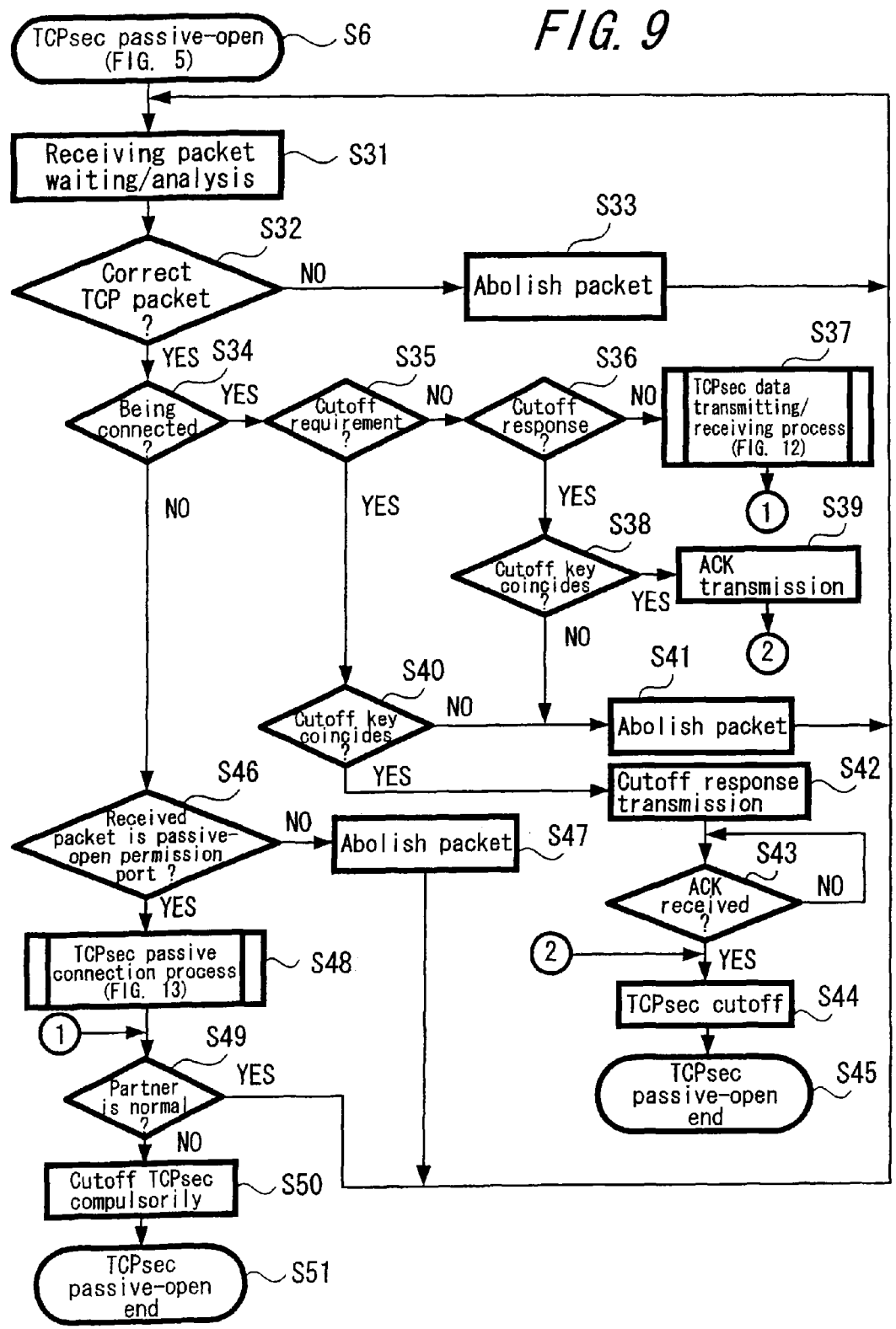
FIG. 9 is a flowchart showing detail of a TCPsec passive-open process S6 in FIG. 5.

First, when the TCPsec data transmitting and receiving process starts in step S37 of FIG. 9 and step S76 of FIG. 11, it is judged first whether or not there is a transmission request from a higher layer application of the host A (step S92). Then, in a case when there is a transmission request from a higher layer application of the host A, the transmission data is encrypted in the transmission side host A (step S93) authentication data are added thereto (step S94) and a packet encrypted and added with authentication data is transmitted to the reception side host B (step S95).

Next, it is judged whether or not there are received data (step S96) and in a case when there are received data, decryption of the received data is carried out (step S97). Next, is judged whether or not the received and decrypted data are correct data (step S98). This judgment is carried out by confirming the decrypted data and the received authentication data and in a case when it is judged as a result of confirming the decoded data that they are not correct data, the TCP/TCPsec is cutoff (step S99). This cutoff is carried out by discarding the receive data and at the same time, by performing a cutoff request to the transmission side. In a case when it is judged in the judging step S98 that the decrypted data are correct data, processing of the received data and more specifically, data delivery to higher layer protocol stack is carried out (step S100), and the TCPsec data transmitting and receiving process is completed (step S101).

Next, it will be explained according to a flowchart diagram of FIG. 13 with respect to a process in a case when a TCPsec passive connection process starts in step S48 of FIG. 9.

First, it is judged whether or not the partner is a correct partner, in other words, whether or not it is a device having authority for connecting to the receiving node (step S102) and in a case when it is not a correct partner, a process for cutting-off TCPsec is carried out (step S103). If it is judged in judging step S102 that the connection partner is a correct partner, a connection response is transmitted from the reception side host B (step S104).

Then, it is confirmed whether or not there is information of the partner who transmitted the connection response within the receiving node (step S105). In a case when there is not the partner information within the receiving node, the partner information is obtained from the present system, more specifically, from the install server used when $TCP^2$ is installed (step S106). Alternatively, the flow proceeds to step S107 by obtaining the partner information from the server of third party authentication. As for the obtaining information, it is possible to use one or a plurality of $TCP^2$ ID on the partner side, user ID, password, biometrics information, inherent apparatus information, LAN connecting apparatus information and the like. It should be noted that it is necessary to carry out the obtaining operation anew even in a case when the node already possesses the obtaining information from the server if it goes beyond the term of validity or the number of times of effective uses.

Next, it is judged whether or not the partner information corresponds to the correct partner, that is, whether or not it is a partner admitted for accessing the receiving node (step S107). Here, if the connecting partner is a correct partner, the TCPsec passive connection is completed (step S108), but in a case when it is not a correct partner, TCPsec cutoff is carried out so as to stop the connection (step S103).

Next, it will be explained according to a flowchart diagram of FIG. 14 with respect to a process in a case when a TCPsec active connection process starts in step S88 of FIG. 11.

Figure 13:
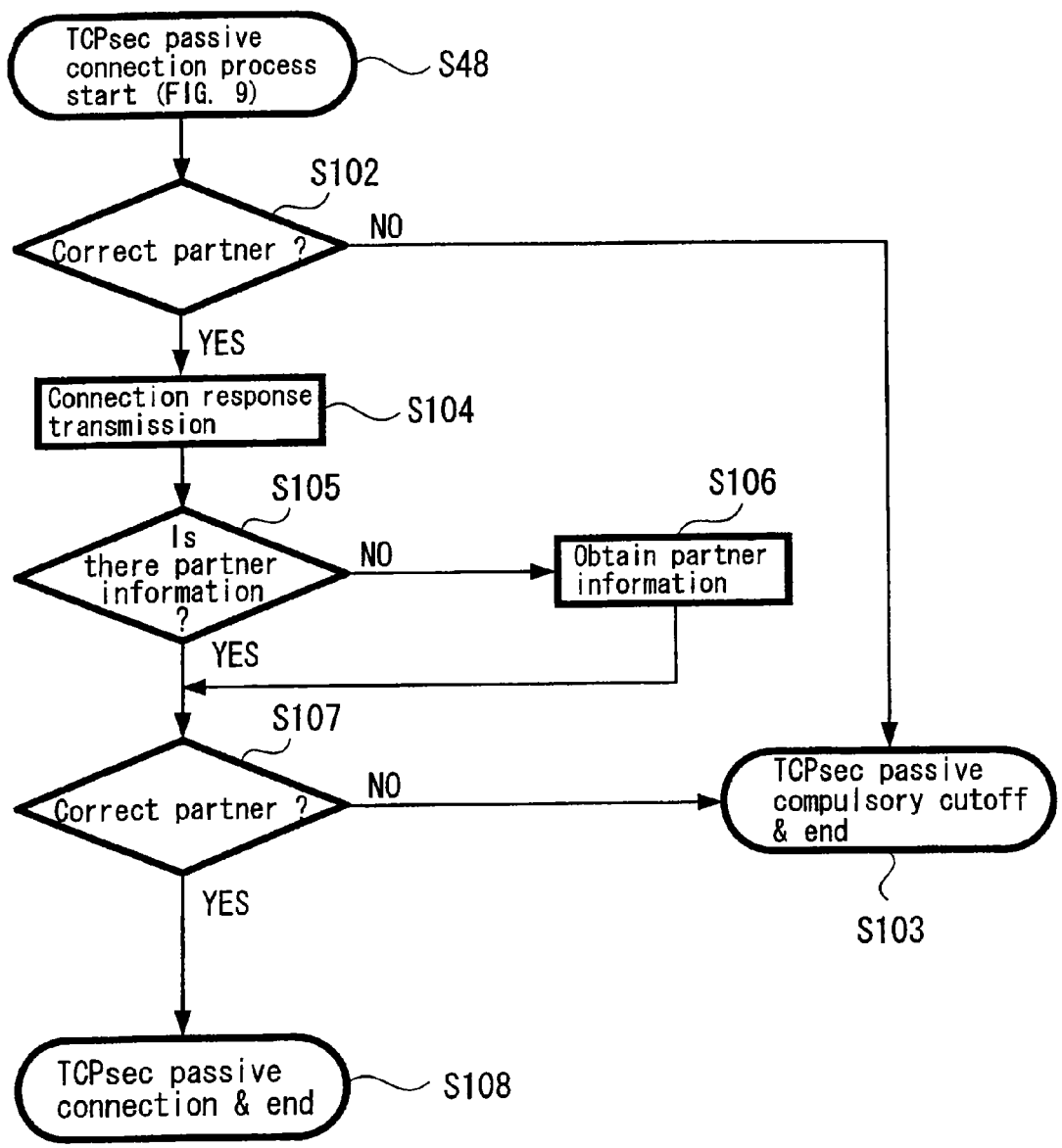
FIG. 13 is a flowchart showing detail of a TCPsec passive connection process S48 in FIG. 9.

Similarly as a case of the passive connection process in FIG. 13, first, it is judged whether or not the partner who requested a connection is a correct partner, in other words, whether or not it is a communication from a partner having authority for accessing the receiving node (step S109). If it is a communication from a partner who does not have accessing authority, the TCPsec active connection is cutoff so as to end the flow (step S110).

If it is judged as a correct partner in judging step S109, an affirmative connection response (ACK) is transmitted from the transmission side host with respect to the reception side host B (step S111).

Next, it is judged whether or not the node possesses information of the partner side (step S112). In a case when there is no partner information within the node, the partner information is obtained from the present system, more specifically, from the install server used when $TCP^2$ is installed (step S113). Alternatively, the flow proceeds to step S114 by obtaining the partner information from the server of third party authentication. Here, as for the obtaining information similarly as step S106 of FIG. 13, it is possible to use one or a plurality of $TCP^2$ ID on the partner side, user ID, password, biometrics information, apparatus information, LAN connecting apparatus information and the like. It should be noted that it is necessary to carry out the obtaining operation anew even when the own computer already possesses the obtaining information from the server if it goes beyond the term of validity or the number of times of effective uses.

Next, it is judged whether or not the partner information corresponds to the correct partner, that is, whether or not it is a partner admitted for accessing the receiving node (step S114). If the connecting partner is a correct partner, the TCPsec active connection is completed (step S115), but in a case when it is not a correct partner, TCPsec cutoff is carried out so as to stop the connection (step S110).

As mentioned above, it was explained within $TCP^2$ of the present invention with respect to the passive-open and active-open communication processes using TCP/TCPsec.

Next, it will be explained with respect to a communication system and a communication method using UDP/UDPsec, such as shown in FIG. 3, which is a second exemplified embodiment according to the present invention.

Figure 15:
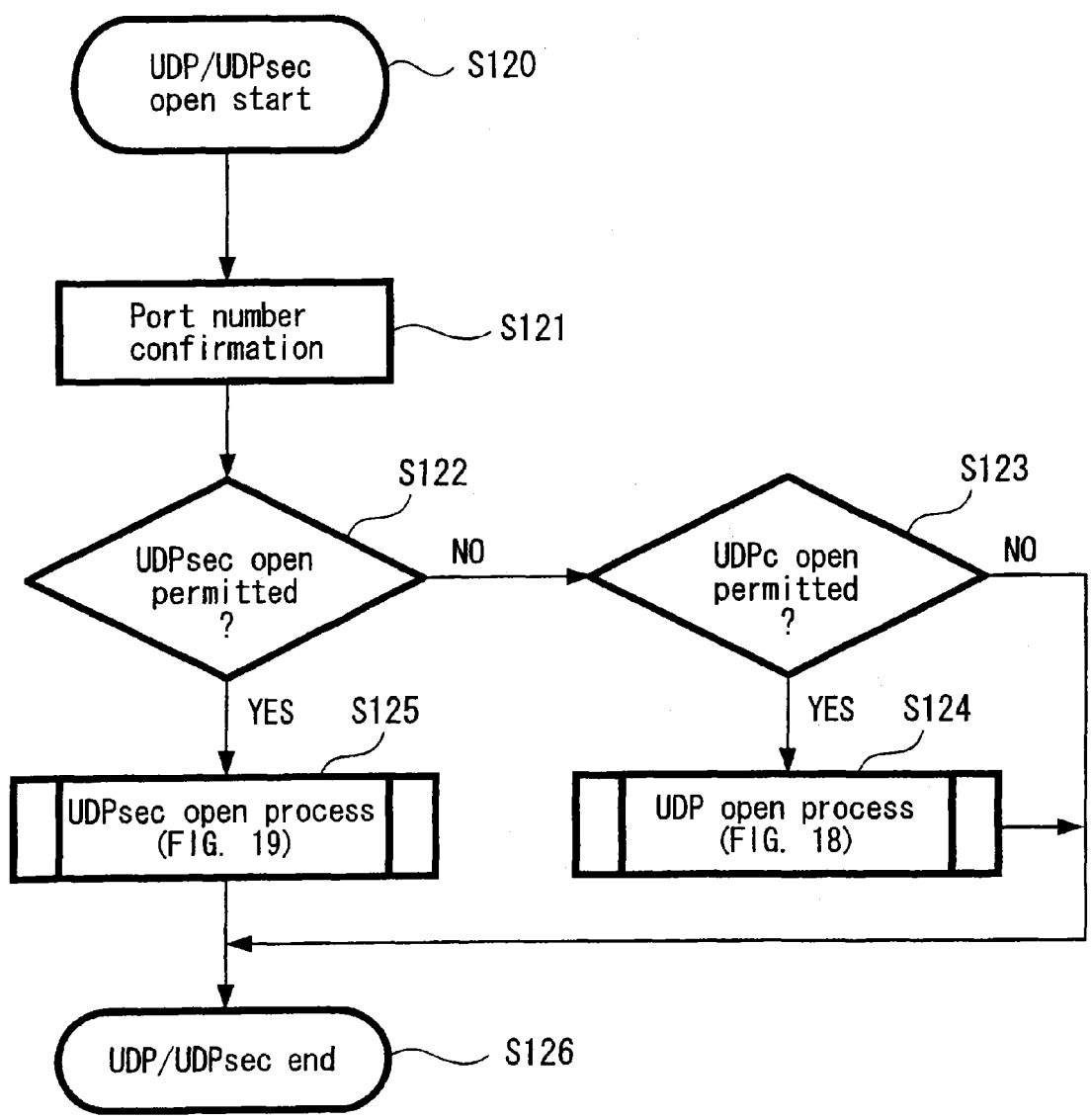
FIG. 15 is a flowchart showing a UDP/UDPsec open process according to an exemplary embodiment of the present invention.
Figure 16:
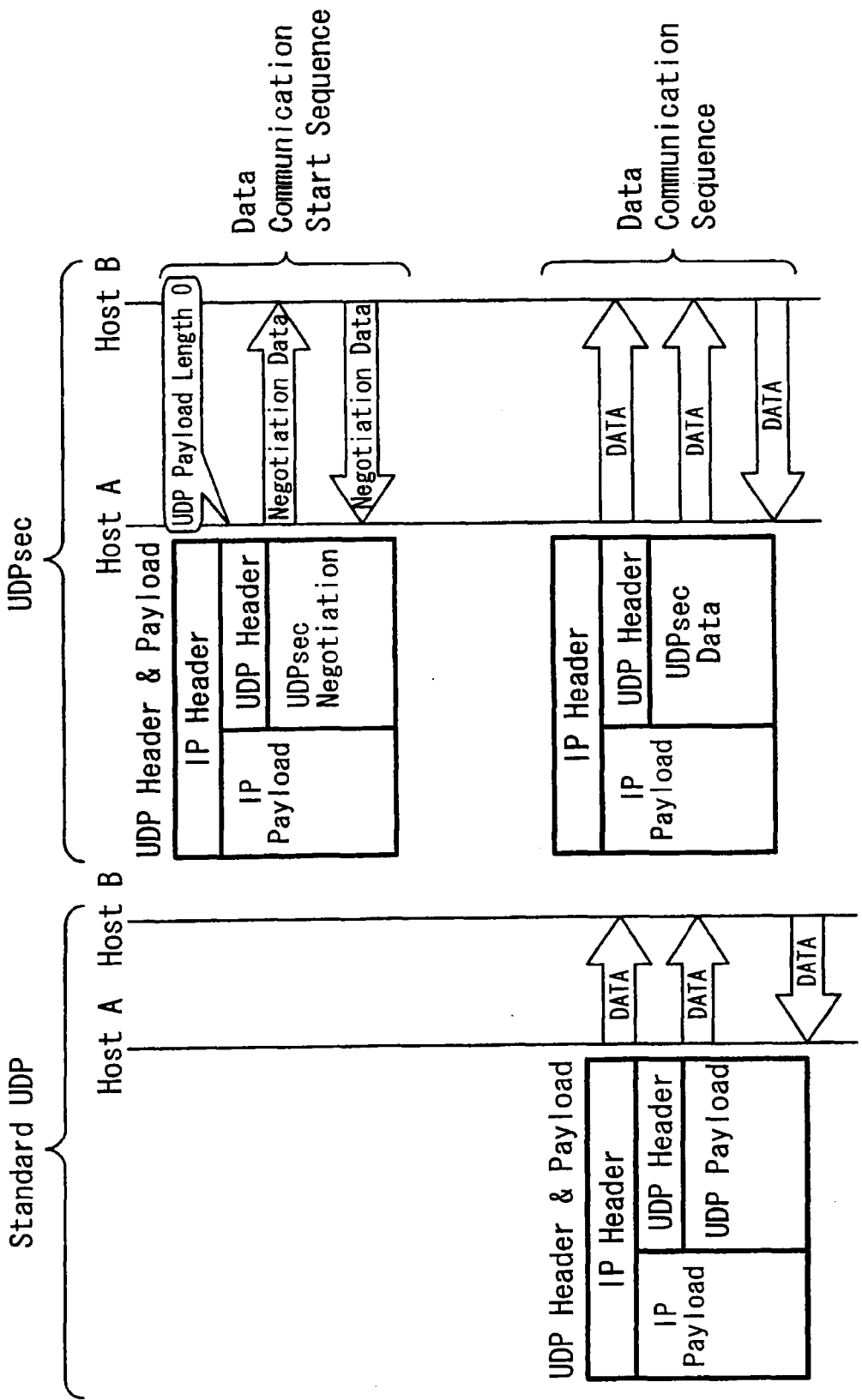
FIG. 16A is a sequence showing of a UDP unicast communication according to an exemplary embodiment of the present invention.
FIG. 16B is a sequence showing of a UDPsec unicast communication according to an exemplary embodiment of the present invention.
Figure 17:
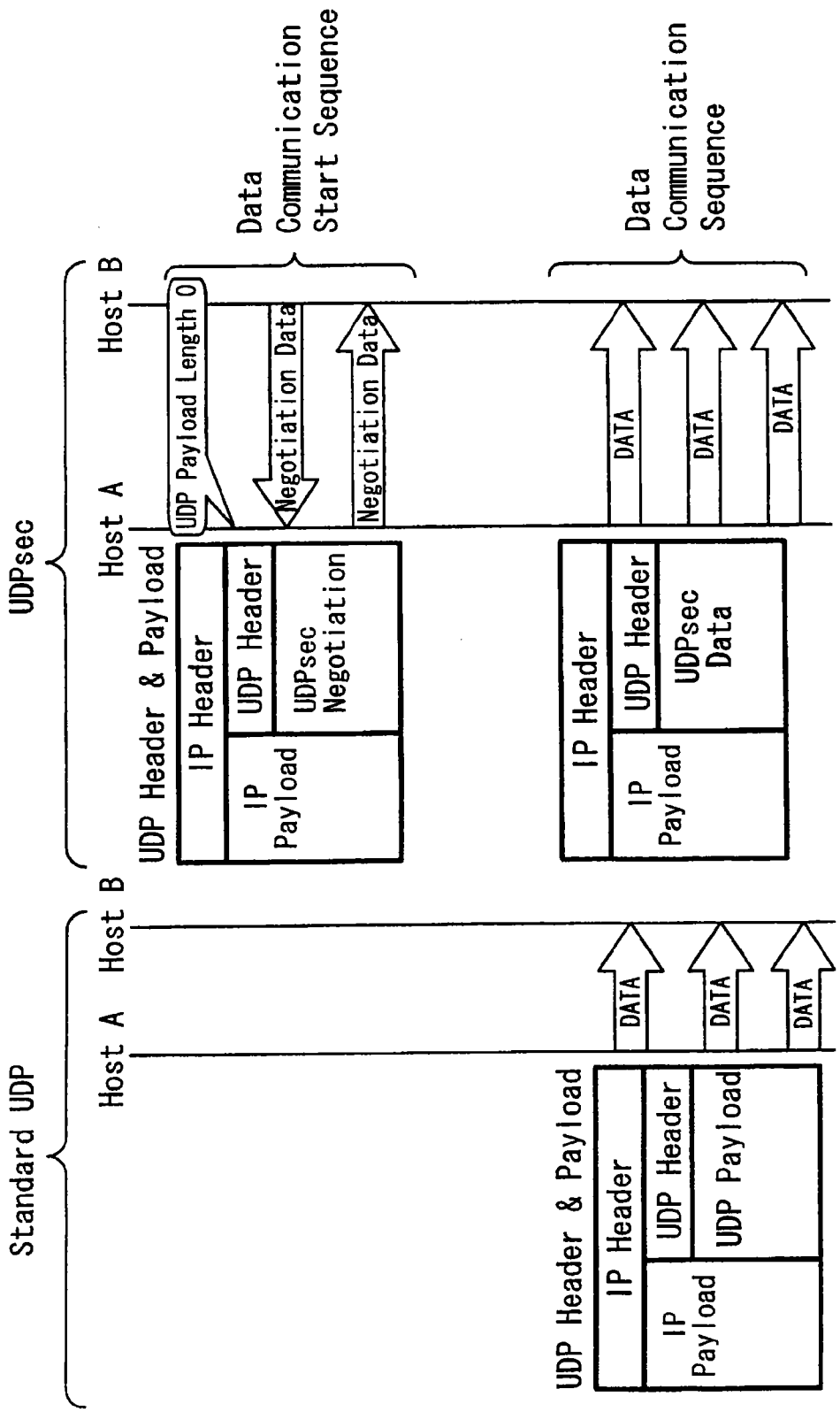
FIG. 17A is a flowchart showing a UDP broadcast communication according to an exemplary embodiment of the present invention.
FIG. 17B is a flowchart showing a UDPsec broadcast communication according to an exemplary embodiment of the present invention.

FIG. 15 is a flowchart diagram for explaining with respect to a passive-open process of UDP/UDPsec which is used in the second exemplified embodiment of the present invention.

Figure 18:
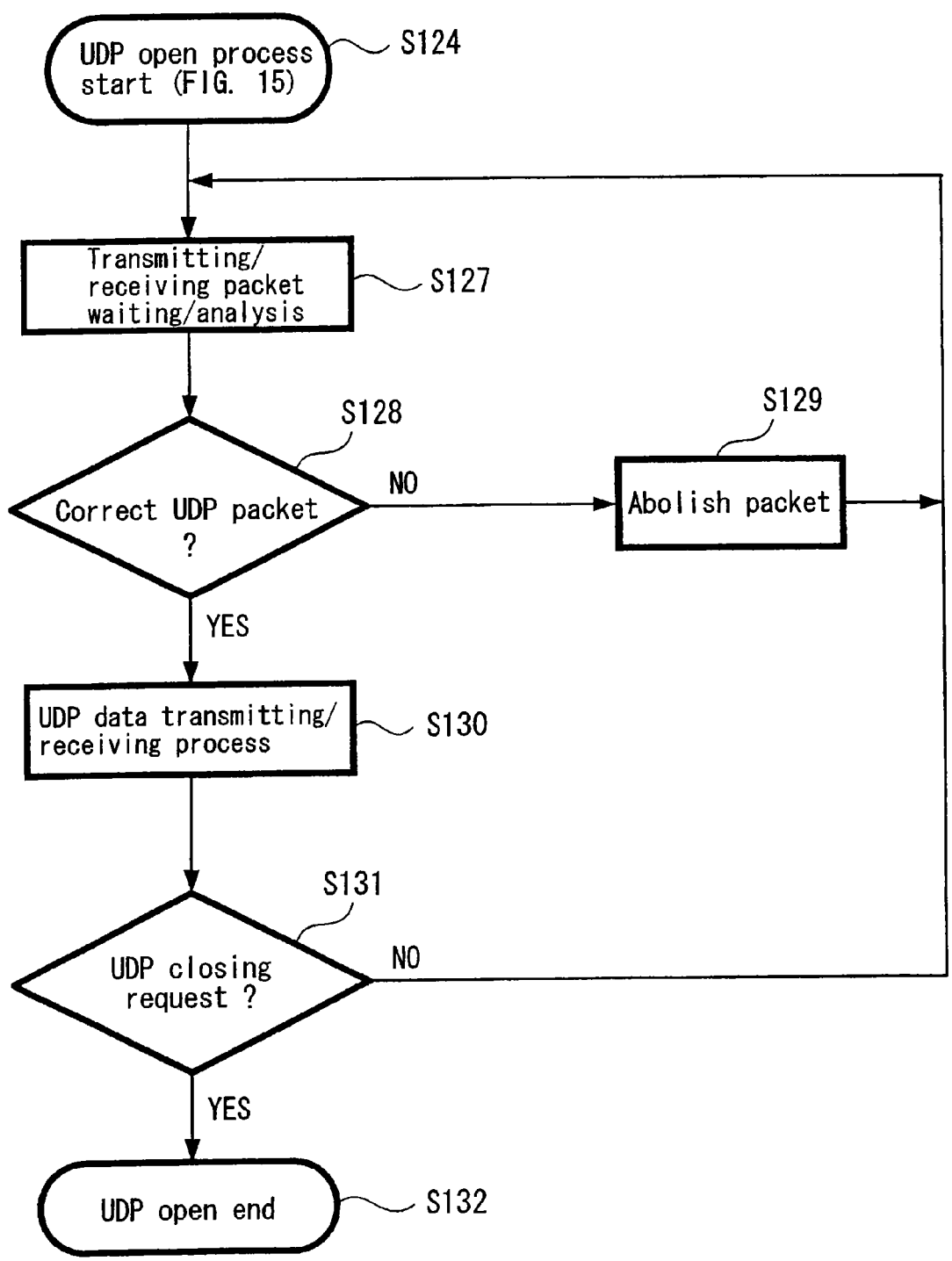
FIG. 18 is a flowchart showing detail of a UDP open process S124 in FIG. 15.

This process starts from a higher layer application-program (step120). First, analysis of the port number to be opened, more specifically, definition condition of the port number is confirmed (step121). Next, it is judged whether or not the port number is made to be UDPsec open (step S122) In a case when it is not made to be UDPsec open, it is judged whether or not UDP is open (step123). Then, in a case when neither UDPsec nor UDP is permitted to be open UDP/UDPsec will be ended (step S126). In a case when UDP is permitted to be open in judging step S123, that is, in a case when UDP is permitted to be open while UDPsec is not permitted to be open, a UDP open process shown in FIG. 18 is carried out (step S124) and also, in a case when UDPsec is open in judging step S122, a UDPsec open process is carried out whether or not UDP is open (step S125) and the UDP/UDPsec open process is ended (step S126). It should be noted that it is possible from an application of a higher layer to communicate by UDPsec or UDP according to $TCP^2$ judgment even if an open condition is carried out for UDP.

Next, it will be explained according to FIGS. 16A-16B with respect to a sequence process in a unicast communication using UDP/UDPsec, which is one example of a second exemplified embodiment of the present invention.

FIGS. 16A-B are diagrams for explaining a packet (including by header and payload) of a start sequence, and, a data communication sequence of a unicast communication in standard UDP and in UDPsec of $TCP^2$.

FIG. 16A shows a communication sequence using standard UDP and FIG. 16B shows a sequence of an encryption communication by UDPsec.

The standard UDP of FIG. 16A shows an example in which applications are UDP open for both the host A and the host B. When an application of the host B becomes UDP open, a UDP open process (see step S124 of FIG. 15 and FIG. 18) starts. Likewise, in a case when an application of the host A becomes UDP open. In this manner, it becomes possible to carry out a UDP data communication. Here, in the unicast communication shown in FIG. 16A, data transmission is possible from either one of the host A and the host B.

Next, a communication process sequence by UDPsec which is a $TCP^2$ encryption systems according to an exemplary embodiment of the present invention will be explained.

FIG. 16B is an example of a case in which an encryption communication is carried out according to UDPsec shows a case in which it is judged that applications are UDP open in both of the host A and the host B, and, $TCP^2$ is open by UDPsec.

When the host B becomes UDPsec open, a UDPsec open process (see step S125 of FIG. 15 and FIG. 19) starts. Likewise, also in a case when the host A becomes UDPsec open. Then, it becomes possible to realize a UDPsec data communication.

Also in the unicast communication using UDPsec shown in this FIG. 16B, as with UDP, data is transmitted from either one of the host A side and the host B side. In case of FIG. 16B, it will be explained assuming that first, there is a transmission request of UDP data from an application of the host A. When the transmission request of UDP data is received from the application, the host B starts a UDPsec unicast reception starting process and starts a negotiation. If the partner is a correct partner as a result of the negotiation, the negotiation is completed and the transmission request of UDP data is transmitted as UDPsec data (cryptograph data) from the application. As with UDP, in UDPsec unicast communication, there is no return of ACK (acknowledgment) from the data receiving side. Consequently, there is no function of delivery confirmation and data guarantee, but the data communication is of higher speed relative to TCP, suitable for a communication of large-capacity video data or the like, as known to those skilled in the art.

FIGS. 17A-17B is a diagram for explaining a packet (including by header and payload) of a start sequence, and, a data communication sequence of a broadcast communication in standard UDP and in $TCP^2$.

FIG. 17A is a communication sequence diagram by standard UDP and FIG. 17B is that by $TCP^2$ UDPsec of an exemplary embodiment of the present invention.

FIG. 17A is a communication sequence diagram by the standard UDP and FIG. 17B is one by UDPsec of $TCP^2$ according to an exemplary embodiment of the present invention. In the standard UDP of FIG. 17A, applications are UDP open for both the host A and the host B. Then, when an application of the host B becomes UDP open, a UDP open process (see step S124 of FIG. 15 and FIG. 18) starts. Likewise, in a case when an application of the host A becomes UDP open. In this manner, it becomes a condition in which a UDP data communication can be carried out.

Also, both of the host A and the host B can generate data, but FIG. 17A is a diagram in which data flows from the host A side to the host B side in one direction for the reason of a broadcast communication therein. Functions of delivery confirmation and data guarantee are not mounted, because ACK (acknowledgment) is not returned from the received host B side. It should be noted in a case when data are broadcasted that it becomes possible to broadcast data by making sub-net addresses of the IP address to be all "1".

Next, it will be explained with respect to an encryption communication according to UDPsec of FIG. 17B. Also in this case, the applications become UDP open for both of the host A and the host B and $TCP^2$ is open by UDPsec.

When the host B becomes UDPsec open, a UDPsec open process (step S125 of FIG. 15 and FIG. 19) starts. Likewise, when the host A becomes UDPsec open. In this manner, it becomes a condition in which UDPsec data communication can be carried out.

It will be explained as shown in FIG. 17B in which a transmission request of UDP broadcast data (data which IP address shows a broadcast) is provided from the application of the host A. When the transmission request of UDP broadcast data is received from the application, it is delivered as cryptograph data by UDPsec to unspecific hosts without negotiation. When the host B receives the broadcast data, it starts a UDPsec broadcast receiving start process in step S141 of FIG. 19 to be described hereinafter. A negotiation is started between the host A and the host B and if the partner is a correct partner, the negotiation is completed and the broadcast data are decrypted and transmitted to the application.

Next, it will be explained according to FIG. 18 with respect to an open process of standard UDP in step S124 of FIG. 15.

FIG. 18 is a flowchart diagram of a UDP open process and this process is a process which is started in a case when the protocol processed in step S124 of FIG. 15 was determined as UDP.

First, a transmission request or a receiving packet from the application is awaited and when a transmission request or a packet is received, a packet analysis is carried out (step S127). Here, the reason why not only a receiving packet but also a transmission request are analyzed to prevent communication with an unspecified numbers of hosts by making the host A a source of distributed denial of service (DDOS) attack. After the analysis of this transmitting and receiving packet is carried out, it is judged whether or not it is a correct packet, that is, whether or not it is not a UDP protocol attack pattern in a DoS attack (step S128). In a case when it is judged as an improper packet in this judging step S128, the packet is discarded (step S129) and a next packet is awaited.

In a case when it is judged as a correct packet in judging step S128, a UDP data transmitting and receiving process is carried out (step S130) and subsequently, it is judged whether or not there is a UDP closing request from a higher layer application (step S131). In a case when there is a UDP closing request from a higher layer application, the UDP open process is ended (step S132).

Figure 19:
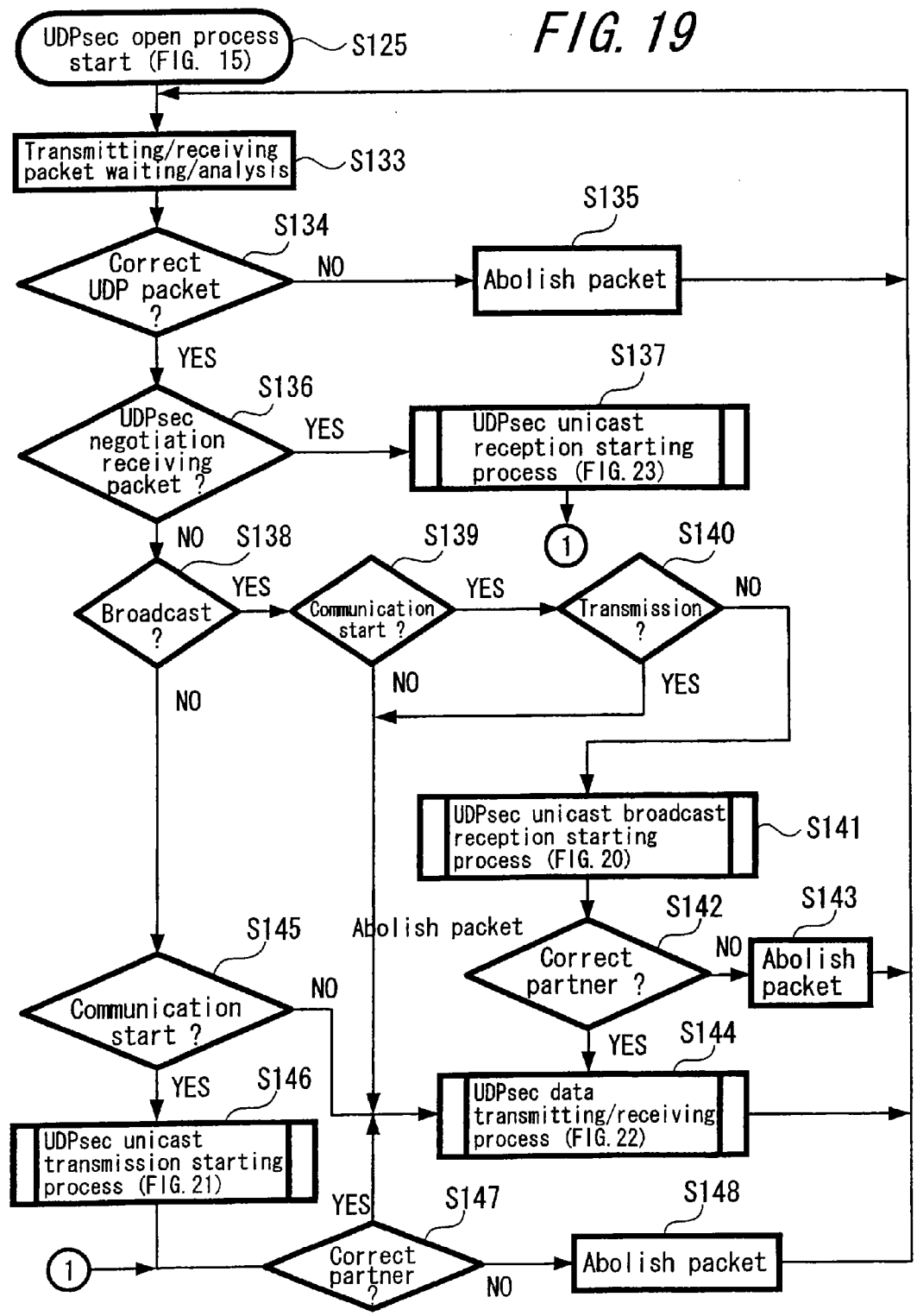
FIG. 19 is a flowchart showing detail of a UDPsec open process S125 in FIG. 15.

Next, UDPsec will be explained according to FIG. 19 with respect to a UDPsec open process in step S125 of FIG. 15. FIG. 19 is a flowchart of a process in the UDPsec open, this process is started as shown in step S125 of FIG. 15 in a case when the protocol to be processed is determined as UDPsec.

First, a transmission request or a received packet is awaited from the application. The analysis of the transmission request or the received packet is carried out (step S133). Next, it is judged whether or not the transmission request or transmitting and receiving packet from the higher layer application is a correct UDP packet, that is, whether or not it is not a TCP protocol attack pattern in a DoS attack (step S134). In a case when it is judged as not a correct UDP packet in judging step S134, the packet is discarded (step S135) and a next packet is awaited.

In a case when it is judged as not a correct UDP packet in judging step S134, it is judged next whether or not the receiving packet is one after a UDPsec negotiation (step S136).

Figure 23:
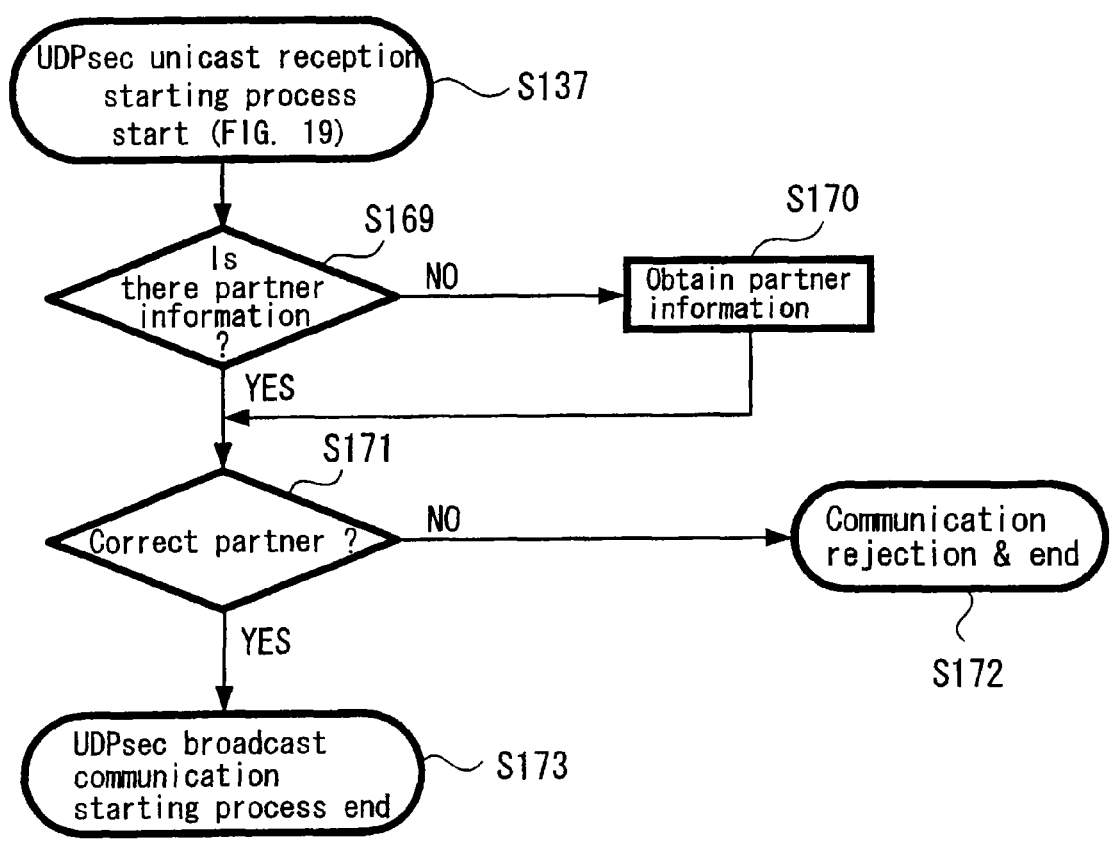
FIG. 23 is a flowchart showing detail of a UDPsec unicast receiving start process S137 in FIG. 19.

Then, in a case when it is judged as a result thereof that it is a negotiation packet of UDPsec, a UDPsec unicast receiving start process shown in FIG. 23 to be described hereinafter is carried out, (step S137) and the flow proceeds to step S147.

Figure 22:
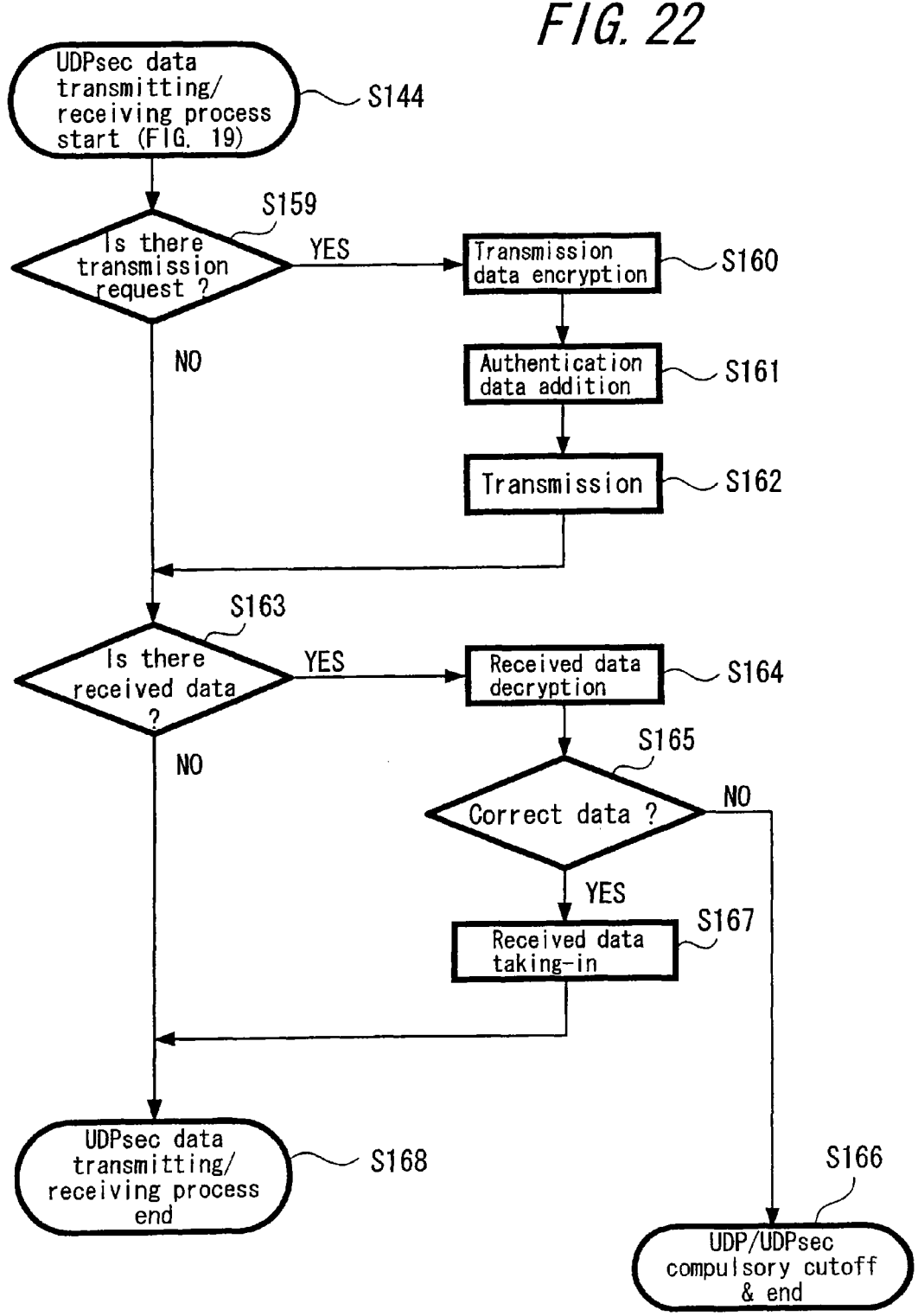
FIG. 22 is a flowchart showing detail of a UDPsec data transmitting and receiving process S144 in FIG. 19.

Also, if it is judged as not a negotiation packet of UDPsec in judging step S136, it is judged subsequently whether or not it is a broadcast communication (step S138). Then, in a case when it is judged as a broadcast communication, it is judged whether or not it is a communication start packet, that is whether or not it is a first communication packet after opened (step S139) and in a case when it is not a start packet, a UDPsec data transmitting and receiving process explained in FIG. 22 is carried out (step S144). In a case when it is judged as a communication start packet in judging step S139, it is judged next whether or not it is a transmission packet (step S140). Then, if it is a transmission packet as a result thereof, a UDPsec data transmitting and receiving process mentioned above is carried out (step S144), but in a case when it is judged as not a transmission packet, a UDPsec broadcast receiving start process of FIG. 20 to be described hereinafter is carried out (step S141). It is judged after this receiving start process whether or not the transmitted packet is one from a correct partner (step S142). Then, if it is judged in judging step S142 that the transmitted packet is not one from a correct partner, the packet is discarded (step S143) and a next packet will be awaited. In a case when it is judged as a correct partner in judging step S142, a UDPsec data transmitting and receiving process shown in FIG. 22 is carried out (step S144).

Also, in a case when it is judged as not a broadcast communication in judging step S138, more specifically, that it is a unicast communication, it is judged whether or not it is a communication start packet, more specifically, it is a first communication packet after opened (step S145). In a case when it is judged as a result thereof that it is not a start packet, a UDPsec data transmitting and receiving process describe in detail in FIG. 22 is performed (step S144).

Figure 21:
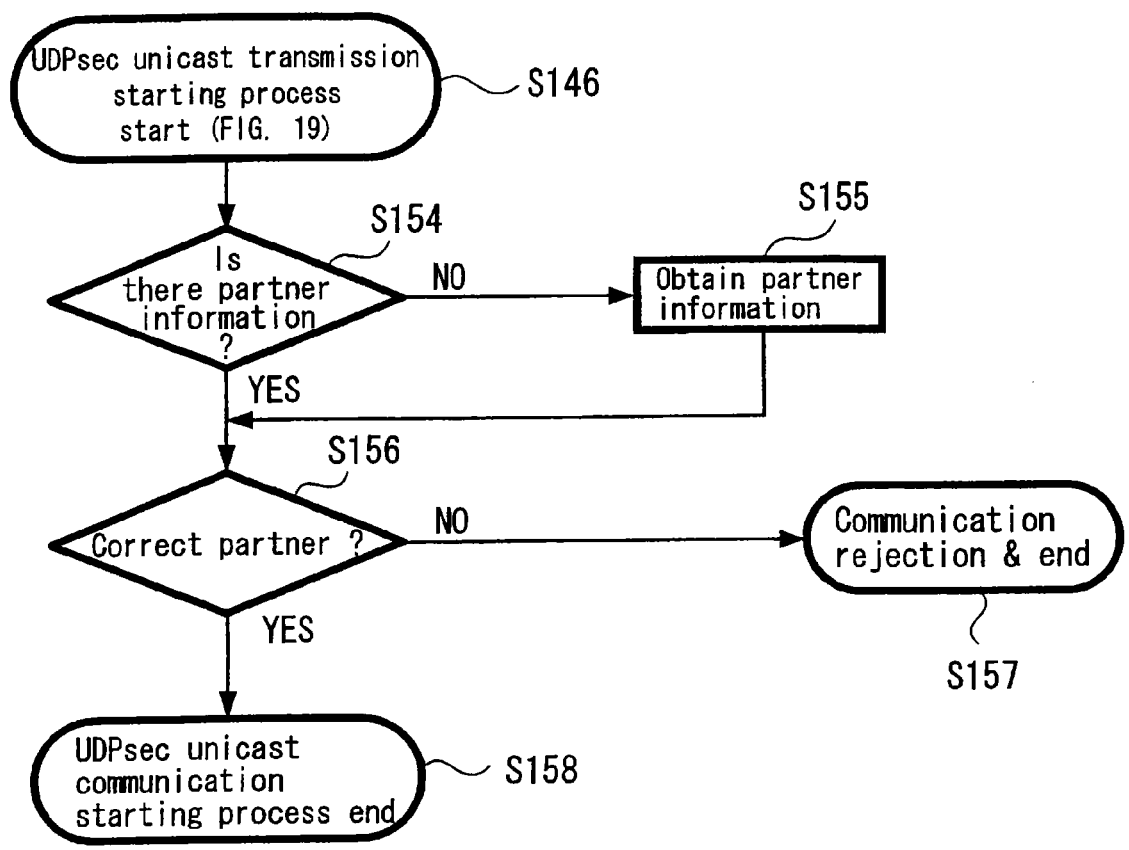
FIG. 21 is a flowchart showing detail of a UDPsec unicast transmission starting process S146 in FIG. 19.

Also, in a case when it is judged in judging step S145 that it is a first communication packet after open, a UDPsec unicast transmission starting process described in FIG. 21 is carried out (step S146). Thereafter, it is judged whether or not the communication partner is a correct partner (step S147) and in case of a correct partner, a UDPsec data transmitting and receiving process is performed successively (step S144), and in a case when it is judged as not a correct partner, the received packet is discarded (step S148) and the flow returns to step S133 and a next packet is awaited.

Figure 20:
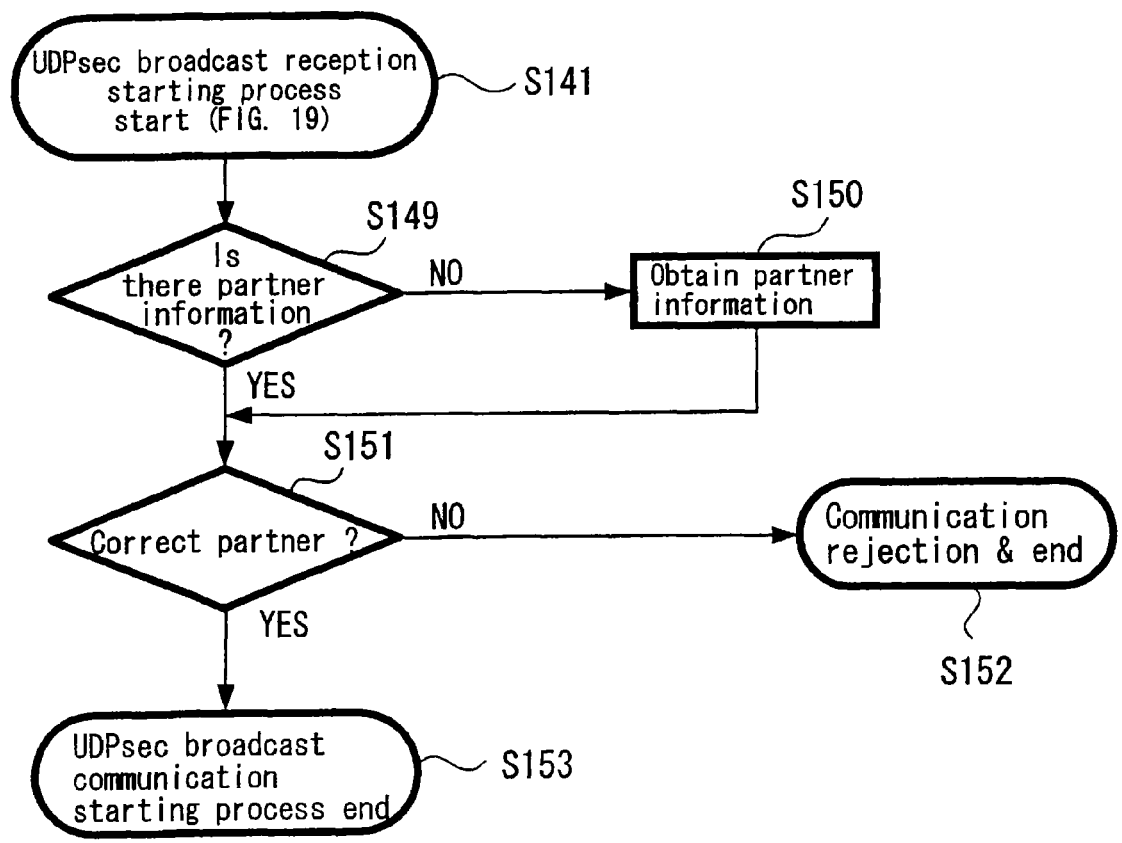
FIG. 20 is a flowchart showing detail of a UDPsec broadcast receiving start process S141 in FIG. 19.

Next, it will be explained according to a flowchart diagram shown in FIG. 20 with respect to a process at a start of UDPsec broadcast receiving in step S141 of FIG. 19.

First, it is judged whether or not the receiving node possesses information of a partner who delivered the broadcast (step S149). Then, in a case when the information is not possessed, the partner information is obtained from the install server which was used when the present system was installed (step S150). Alternatively, information is obtained from a server of a third party authentication. This obtaining information utilizes one or a plurality of combinations among $TCP^2$ ID of the partner, user ID, password, biometrics information, apparatus information, LAN connection apparatus information and the like. Next, it is judged whether or not the partner who delivered the broadcast is a correct partner (step S151). Then, if it is judged as a correct partner, UDPsec communication is received and the communication starting process of the UDPsec broadcast is ended (step S153), and it is instructed to step S142 of FIG. 19 that the reception is accepted. In a case when it is judged as not a correct partner in judging step S151, a communication rejection is carried out (step S152) and it is instructed also to step S142 of FIG. 19 that the data are not to be obtained. It should be noted that even if there is obtained information relating to the partner in step S149, it is better to carry out an obtaining operation of the partner information in step S150 anew in a case when it goes beyond the term of validity or the number of times of effective uses (i.e., expiration).

Next, it will be explained according to a flowchart diagram shown in FIG. 21 with respect to a UDPsec unicast transmission starting process in step S146 of FIG. 19.

First, it is confirmed whether or not the receiving node possesses information of the transmission partner (step S154). Then, in a case when the information is not possessed, the partner information is obtained by a method similar to step S150 of FIG. 20 (step S155). This obtaining information is same as the case of FIG. 20.

Next, it is judged whether or not the transmission partner is a correct partner (step S156). Then, if it is judged as a correct partner, transmission by UDPsec comes to be possible and the UDPsec unicast communication starting process is ended (step S158), and it is instructed to step S147 of FIG. 19 that transmission is possible. In a case when it is judged as not a correct partner in judging step S156, a communication rejection is carried out (step S157) and it is instructed to step S147 of FIG. 19 that data will not be obtained.

Next, it will be explained according to FIG. 22 with respect to a UDPsec data transmitting and receiving process shown in step S144 of FIG. 19.

First, it is judged whether or not there was a transmission request from the application of the host A (step S159). If there is a transmission request, the data are encrypted in the transmission side host A (step S160), authentication data are added to the encrypted data (step S161), and the packet encrypted and added with the authentication data is transmitted to the reception side host B (step S162).

Next, it is judged in the reception side host B whether or not there are received data (step S163) and in a case when there are received data, decryption of the received data is carried out (step S164). Next, it is judged whether or not the received and decrypted data are correct data (step S165). This judgment is carried out by confirming the decrypted data and the received authentication data and in a case when it is judged as not correct data as a result of confirming the decoded data, UDP/UDPsec is cutoff (step S166). In a case when it is judged in judging step S165 that the decrypted data are correct data, taking-in of the received data, more specifically, data delivery to the higher layer protocol stacks is carried out (step S167) and the UDPsec data transmitting and receiving process is completed (step S168).

Next, it will be explained according to a flowchart of FIG. 23 with respect to a UDPsec unicast reception starting process shown in step S137 of FIG. 19.

First, it is judged whether or not the receiving node possesses the partner information of the packet received by unicast (step S169). In a case when the partner information is not possessed, the partner information is obtained from the install server used when the present system was installed or from the server authenticated by the third party (step S170). As for the obtaining information, it is same as in a case of step S150 of FIG. 20 or step S155 of FIG. 21 and it corresponds to one or a plurality of $TCP^2$ ID on the partner side, user ID, password, biometrics information, apparatus information, LAN connecting apparatus information and the like.

Next, it is judged whether or not the partner transmitting unicast is a correct partner (step S171). If it is judged as a correct partner, the process proceeds to step S147 of FIG. 19, is the reception by UDPsec is possible and the UDPsec broadcast communication starting process is ended (step S173). In a case when it is judged as not a correct partner in judging step S171, it is delivered to step S147 of FIG. 19 that data will not be obtained and the communication is rejected (step S172).

As mentioned above, it was explained in detail according to flowchart diagrams and sequence diagrams with respect to an encryption process using TCPsec which is a first exemplified embodiment according to the present invention and an encryption process using UDPsec which is a second exemplified embodiment of according to the present invention.

Next, it will be explained according to table 2 and FIG. 24 with respect to a matter how $TCP^2$ of the present invention compares with conventional IPsec or SSL.

TABLE 2

Function Comparison of IPsec, SSL and $TCP^2$

|   |   | IPsec | SSL | TCP2 |
|---|---|---|---|---|
| (1) | Communication between Client-Client | ○ Direct communication is available. | x Direct communication is unavailable. Communication is available through a special server. | ○ Direct communication is available. |
| (2) | PPP Mobile Environment | Δ It is possible by utilizing XAUTH. However, there is a problem of security. | ○ Communication is available. | ○ Direct communication is available. |
| (3) | ADSL Environment | | | |
| (4) | NAT, IP Masquerade Environment | Δ It can be realized by being commonly used with NAT-T. | ○ Communication is available. | ○ Communication is available. |
| (5) | DoS Attack to TCP/IP Protocol Stack | ○ It is possible to have correspondence with DoS attack. | x Correspondence is unavailable. | ○ It is possible to have correspondence with DoS attack. |
| (6) | Under Bad Communication Environment (Environment where Communication Errors often Occur Caused by Many Physical Noises) | x Correspondence is inadequate. Lowering of throughput is incurred. | ○ Correspondence is available. | ○ Correspondence is available. |
| (7) | Communication between Different LANs | Δ Communication is unavailable when the subnet address is the same address. | ○ Communication is available. | ○ Communication is available. |

TABLE 2-continued

Function Comparison of IPsec, SSL and TCP²

| | | IPsec | SSL | TCP2 |
|---|---|---|---|---|
| (8) | Different Network Environment | Δ Management is hard and difficult | ○ Management can be simplified. | ○ Management can be simplified. |
| (9) | Connection through a plurality of Carriers | x Communication is unavailable. | ○ Communication is available. | ○ Communication is available. |
| (10) | Secure Communication of All UDP Ports | ○ Secure Communication is available. | x Communication is unavailable. | ○ Communication is available. |
| (11) | Secure Communication of All TCP Ports | ○ Secure Communication is available. | x Communication is unavailable except a specific TCP port. | ○ Communication is available. |
| (12) | Limitation in Application | ○ Not affected. | x It is necessary to change the socket program. | ○ It is possible to use socket program portion as it is. |
| (13) | Access Unit | IP Unit | Resource Unit (URL Unit, Folder Unit) | PORT Unit, Session Unit |
| (14) | MTU (Maximum Segment Size) | Δ Adjustment is necessary. | ○ Communication is Available without being Conscious of MTU. | ○ Communication is available without consciousness. |
| (15) | Internet Telephone Using VoIP under Mobile Environment | Δ It is possible by utilizing XAUTH. However, there is a problem of security. | x It cannot be used. | ○ It can be used. |
| (16) | Internet Telephone Using VoIP under ADSL Environment | Δ It is possible by utilizing XAUTH. However, there is a problem of security. | x It cannot be used. | ○ It can be used. |

TCP² enhances the protection of communication occurring between client-client, DoS attacks to TCP/IP protocols, secure communication of all UDP ports or TCP ports, limitation in applications for which socket programs should be changed so far and the like, which were deficiencies of SSL.

In addition, TCP² is a robust solution with respect to a communication under an inferior environment where errors occur frequently, a communication between different LANs, a connection by way of a plurality of carriers, a PPP mobile environment and a communication under ADSL Environment which were deficiencies of IPsec.

Further, with respect to the Internet using VoIP under mobile environment or ADSL Environment, there are problems both in IPsec and SSL as shown in table 1 and table 2, remedied by TCP².

Further, also with respect to Internet telephone using VoIP between different LANs or between LANs spanning a plurality of carriers, it is possible according to TCP² of an exemplary embodiment of the present invention, while impossible for IPsec and SSL to enable such applications.

Figure 24:
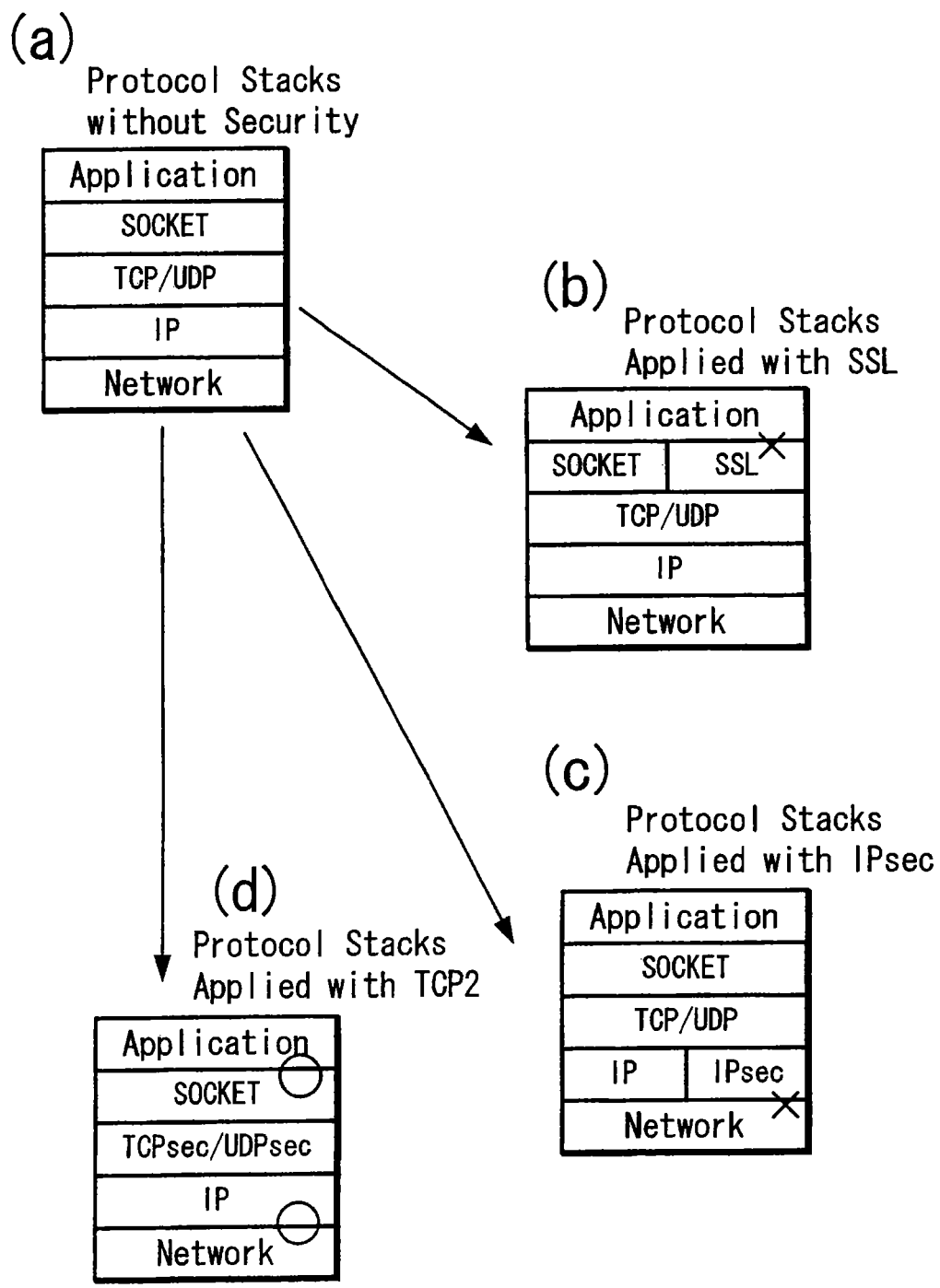
FIG. 24 is a diagram comparing $TCP^2$ with conventional IPsec or SSL.
Figure 25:
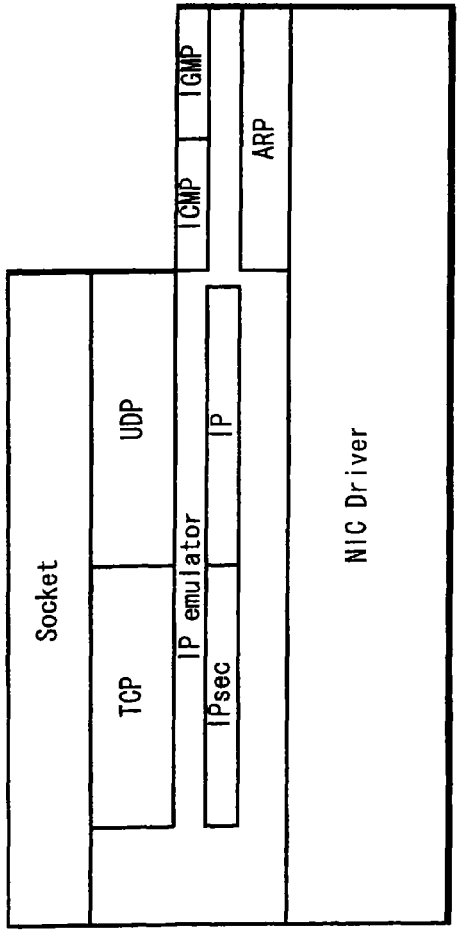
FIG. 25 is a diagram showing a standard communication protocol stack of conventional IPsec.
Figure 26:
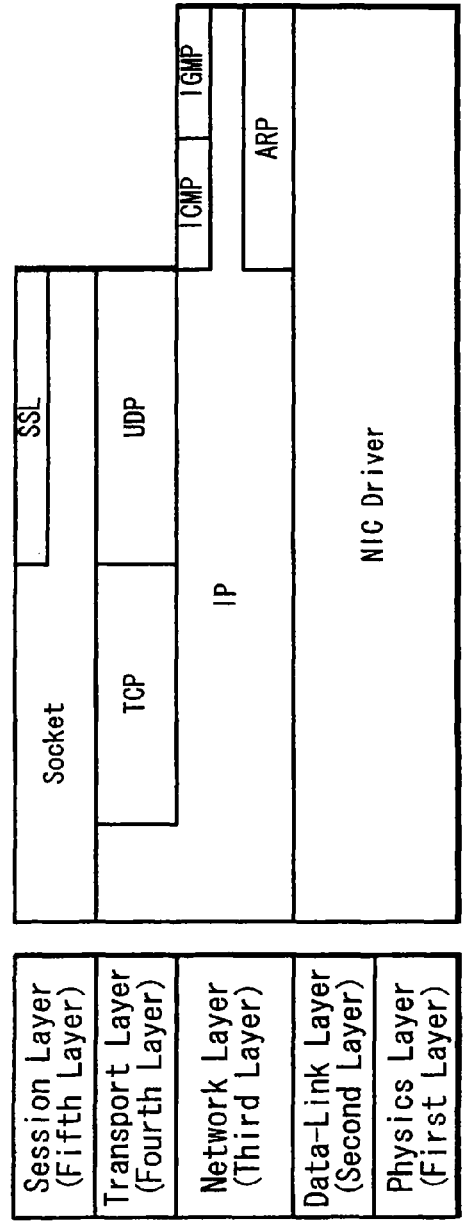
FIG. 26 is a diagram showing a standard communication protocol stack using conventional SSL.

FIG. 24 is a diagram for explaining comparison SSL, IPsec and TCP² (TCPsec/UDPsec) as respectively applied to a protocol stack without security (a); SSL shown in case (b) of FIG. 24, as already described, has no compatibility with respect to an upper layer application, because it is provided in a socket of the session layer (fifth layer); also, IPsec shown in a case (c) of FIG. 24 is positioned in the network layer (third layer) and has no compatibility in the IP layer. On the other hand, TCP² (TCPsec/UDPsec) shown in a case (d) of FIG. 24 is an encryption technology to be introduced in the transport layer (fourth layer) and therefore it is possible to utilize a socket directly when seen from the application layer and further to utilize also an IP directly when seen from the network, so that it does not receive any restriction for constituting a network.

As described above, it can be said that the encryption communication system or the encryption communication method using TCP² according to the present invention has an enhanced security function.

Obviously, readily discernible modifications and variations of the present invention are possible in light of the above teachings. It is therefore to be understood that within the scope of the appended claims, the invention may be practiced otherwise than as specifically described herein.

For example, while described in terms of both software and hardware components interactively cooperating, it is contemplated that the system described herein may be practiced entirely in software. The software may be embodied in a carrier such as magnetic or optical disk, or a radio frequency or audio frequency carrier wave.

Thus, the foregoing discussion discloses and describes merely exemplary embodiments of the present invention. As will be understood by those skilled in the art, the present invention may be embodied in other specific forms without departing from the spirit or essential characteristics thereof. For example, while discussed in the context of a hard-wired TCP/IP communication, the invention is equally applicable to Wi-Fi, Wi-Max, 3GPP, and like implementations. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A networking device that communicates via a network according to a communication protocol, comprising:
a microprocessor configured to
encrypt, in a layer no higher than a transport layer of the communication protocol, at least a payload of a packet to be transmitted according to the communication protocol, the microprocessor appending encryption information generated in the transport layer both before and after the payload;
decrypt at least a payload of a received packet based on encryption information appended before or after the payload of the received packet;
wherein the microprocessor encrypts and decrypts packets when the encryption information in the received packet indicates that transport layer encryption is supported.

2. The networking device according to claim 1, wherein the communication protocol is one of a Transmission Control Protocol (TCP) or a User Datagram Protocol (UDP).

3. The networking device according to claim 1, wherein an encryption algorithm used by the microprocessor is periodically updated.

4. The networking device according to claim 1, wherein the microprocessor does not encrypt plain text.

5. The networking device according to claim 1, wherein the microprocessor does not encrypt the payload of the packet to be transmitted when the encryption information in the received packet indicates that transport layer encryption is not supported.

6. The networking device according to claim 1, wherein the networking device is one of a router, a gateway, a bridge or a server.

7. The networking device according to claim 1, wherein the encryption information of the packet to be transmitted includes information identifying the networking device.

8. The networking device according to claim 7 wherein the information identifying the networking device includes at least one of a serial number, a version number and a release number.

9. The networking device according to claim 7, wherein the information identifying the networking device is obtained from a third-party authentication server.

10. A method to cause a networking device to communicate via a network using a communication protocol, comprising:
decrypting, in a microprocessor of the networking device, at least a payload of a received packet based on encryption information appended before or after the payload of the received packet;
encrypting, in the microprocessor of the networking device and in a layer no higher than a transport layer of the communication protocol, at least a payload of a packet to be transmitted according to the communication protocol when the encryption information in the received packet indicates that transport layer encryption is supported; and
appending, by the microprocessor, encryption information generated in the transport layer both before and after the payload when the encryption information in the received packet indicates that transport layer encryption is supported.

11. The method according to claim 10, wherein the networking device includes one of a router, a gateway, a bridge and a server.

12. The method according to claim 10, the payload of the packet to be transmitted are not encrypted when the encryption information in the received packet indicates that transport layer encryption is not supported.

13. The method according to claim 10, wherein the encryption information of the packet to be transmitted includes information identifying the networking device.

14. The method according to claim 13, wherein the information identifying the networking device includes at least one of a serial number, a version number and a release number.

15. The method according to claim 13, wherein the information identifying the networking device is obtained from a third-party authentication server.

16. The method according to claim 13, wherein the communication protocol is one of a Transmission Control Protocol (TCP) or a User Datagram Protocol (UDP).

17. A non-transitory computer-readable medium storing computer readable instructions thereon, the computer readable instructions when executed by a microprocessor of a networking device cause the microprocessor of the networking device to perform a method comprising:
decrypting at least a payload of a received packet based on encryption information appended before or after the payload of the received packet;
encrypting, in a layer no higher than a transport layer of a communication protocol, at least a payload of a packet to be transmitted according to the communication protocol when the encryption information in the received packet indicates that transport layer encryption is supported; and
appending encryption information generated in the transport layer both before and after the payload when the encryption information in the received packet indicates that transport layer encryption is supported.

18. The non-transitory computer-readable medium according to claim 17, wherein the networking device is one of a router, a gateway, a bridge and a server.

19. The non-transitory computer-readable medium according to claim 17, wherein the payload of the packet to be transmitted are not encrypted when the encryption information of the received packet indicates that transport layer encryption is not supported.

* * * * *